(12) United States Patent
Magenau et al.

(10) Patent No.: US 11,667,734 B2
(45) Date of Patent: Jun. 6, 2023

(54) OXYGEN TOLERANT AND ROOM TEMPERATURE RAFT THROUGH ALKYLBORANE INITIATION

(71) Applicant: DREXEL UNIVERSITY, Philadelphia, PA (US)

(72) Inventors: Andrew J. D. Magenau, Princeton, NJ (US); Olivia Rae Wilson, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 399 days.

(21) Appl. No.: 16/785,162

(22) Filed: Feb. 7, 2020

(65) Prior Publication Data
US 2020/0339713 A1  Oct. 29, 2020

Related U.S. Application Data

(60) Provisional application No. 62/805,702, filed on Feb. 14, 2019.

(51) Int. Cl.
  *C08F 20/56* (2006.01)
  *C08F 2/06* (2006.01)
  (Continued)

(52) U.S. Cl.
  CPC ............. *C08F 20/56* (2013.01); *C08F 2/06* (2013.01); *C08F 2/38* (2013.01); *C08K 5/39* (2013.01); *C08K 5/55* (2013.01); *C08F 2438/03* (2013.01)

(58) Field of Classification Search
  CPC ........ C08F 20/56; C08F 2438/03; C08F 2/38; C08F 2/06; C08K 5/55; C08K 5/39
  See application file for complete search history.

(56) References Cited

U.S. PATENT DOCUMENTS 5,312,871 A  5/1994 Mardare et al.
6,596,899 B1  7/2003 Lai
(Continued)

FOREIGN PATENT DOCUMENTS

WO    199801478 A1   1/1998
WO    2015148319 A1  10/2015

OTHER PUBLICATIONS

Matyjaszewski, Krzysztof, et al. "Grafting from Surfaces for "Everyone": ARGET ATRP in the Presence of Air." Langmuir 23.8 (2007): 4528-4531.
(Continued)

*Primary Examiner* — Robert D Harlan
(74) *Attorney, Agent, or Firm* — Mendelsohn Dunleavy, P.C.

(57) ABSTRACT

A polymerization method including radically polymerizing a monomer in a polymerization medium comprising a chain transfer agent, and a free radical initiator prepared by oxidizing a reaction product of a ligand-reactive decomplexation agent and an alkyl-borane complex of the formula:

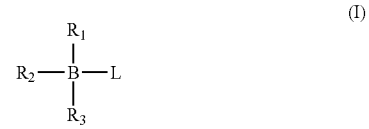

wherein $R_1$, $R_2$, and $R_3$ are independently selected from hydrogen, an alkyl group containing from 1 to 12 carbon atoms, a cycloalkyl group containing from 3-12 carbon atoms, and an aryl group containing from 6 to 12 carbon atoms, wherein the aryl group may be optionally substituted with an alkyl group having from 1 to 10 carbon atoms, and
(Continued)

at least one of $R_1$, $R_2$, and $R_3$ is an alkyl group, a cycloalkyl group or an aryl group, and L is a complexing agent selected from one or more amine groups, amidine groups, hydroxide groups, alkoxyl groups, alkyl ether groups, alkoxide groups and mixtures thereof.

20 Claims, 10 Drawing Sheets

(51) Int. Cl.
*C08F 2/38* (2006.01)
*C08K 5/55* (2006.01)
*C08K 5/39* (2006.01)

(56) References Cited

U.S. PATENT DOCUMENTS

| | | | |
|---|---|---|---|
| 6,762,260 | B2 | 7/2004 | Sonnenschein et al. |
| 9,644,097 | B2 | 5/2017 | Petton et al. |
| 2003/0199653 | A1 | 10/2003 | McCormick, III et al. |
| 2009/0312505 | A1 | 12/2009 | Matyjaszewski et al. |
| 2015/0328588 | A1 | 11/2015 | Schmidt-Leithoff et al. |
| 2017/0174839 | A1* | 6/2017 | Clough ............... C08F 4/54 |

OTHER PUBLICATIONS

Zhang, Lifen, et al. "AGET ATRP of methyl methacrylate catalyzed by FeCl3/iminodiacetic acid in the presence of air." Polymer 49.13-14 (2008): 3054-3059.
Yang, Qizhi et al., "Development of a Robust Photocatalyzed ATRP Mechanism Exhibiting Good Tolerance to Oxygen and Inhibitors." Macromolecules 49.20 (2016): 7653-7666.
Borská, Katarina, et al., "Photochemically Induced ATRP of (Meth)Acrylates in the Presence of Air: the Effect of Light Intensity, Ligand, and Oxygen Concentration." Macromolecular Rapid Communications 38.13 (2017): 1600639.
Fleischmann, Sven et al., "SET-LRP of acrylates in air." Journal of Polymer Science Part A: Polymer Chemistry 48.5 (2010): 1190-1196.
Braunecker, Wade A. et al., "Controlled/living radical polymerization: Features, developments, and perspectives." Progress in Polymer Science 32.1 (2007): 93-146.
Wang, Jie, et al. "Natural RAFT Polymerization: Recyclable-Catalyst-Aided, Opened-to-Air, and Sunlight-Photolyzed RAFT Polymerizations." ACS Macro Letters 5.11 (2016): 1278-1282.
Fu, Q., et al. "Trithiocarbonates as intrinsic photoredox catalysts and RAFT agents for oxygen tolerant controlled radical polymerization." Polymer Chemistry 8.9 (2017): 1519-1526.
Xu, Jiangtao et al al., "Oxygen Tolerance Study of Photoinduced Electron Transfer-Reversible Addition-Fragmentation Chain Transfer (PET-RAFT) Polymerization Mediated by Ru(bpy)3Cl2." Macromolecules 47.13 (2014): 4217-4229.
Chapman, Robert, et al. "Highly Controlled Open Vessel RAFT Polymerizations by Enzyme Degassing." Macromolecules 47.24 (2014): 8541-8547.
Zhang, Baohua, et al. "Enzyme-Initiated Reversible Addition-Fragmentation Chain Transfer Polymerization." Macromolecules 48.21 (2015): 7792-7802.
Liu, Zhifen et al., "Enzymatic Cascade Catalysis for the Synthesis of Multiblock and Ultrahigh-Molecular-Weight Polymers with Oxygen Tolerance." Angewandte Chemie International Edition 56.44 (2017): 13852-13856.
Xu, Jiangtao, et al. "A Robust and Versatile Photoinduced Living Polymerization of Conjugated and Unconjugated Monomers and Its Oxygen Tolerance." Journal of the American Chemical Society 136.14 (2014): 5508-5519.
Shanmugam, Sivaprakash et al., "Exploiting Metalloporphyrins for Selective Living Radical Polymerization Tunable Over visible Wavelengths." Journal of the American Chemical Society 137.28 (2015): 9174-9185.
Shanmugam, Sivaprakash et al., "Photoinduced Oxygen Reduction for Dark Polymerization." Macromolecules 50.5 (2017): 1832-1846.
Xu, Jiangtao, et al. "Organo-photocatalysts for photoinduced electron transfer-reversible addition-fragmentation chain transfer (PET-RAFT) polymerization." Polymer Chemistry 6.31 (2015): 5615-5624.
Yeow, Jonathan, et al. "Oxygen tolerant photopolymerization for ultralow volumes." Polymer Chemistry 8.34 (2017): 5012-5022.
Xu, Sihao, et al. "2-(Methylthio)ethyl Methacrylate: a Versatile Monomer for Stimuli Responsiveness and Polymerization-Induced Self-Assembly in the Presence of Air." ACS Macro Letters 6.11 (2017): 1237-1244.
Fu, Qiang, et al. "Development of a Robust PET-RAFT Polymerization Using Praphitic Carbon Nitride (g-C3N4)." Macromolecules 50.19 (2017): 7509-7516.
Lee, In-Hwan, et al. "Controlled radical polymerization of vinyl ketones using visible light." Polymer Chemistry 8.21 (2017): 3351-3356.
Ren, Kaixuan et al., "Thermoresponsive gels directly obtained via visible light-mediated polymerization-induced self-assembly with oxygen tolerance." Polymer Chemistry 8.23 (2017): 3548-3552.
Ng, Gervase, et al. "Application of oxygen tolerant PET-RAFT to polymerization-induced self-assembly." Polymer Chemistry 8.18 (2017): 2841-2851.
Ahn, Dongchan, et al. "Applications of Fast, Facile, Radiation-Free Radical Polymerization Techniques Enabled by Room Temperature Alkylborane Chemistry." ACS Applied Materials & Interfaces 7.43 (2015): 23902-23911.
Chung, T. C. et al., "A Novel "Stable" Radical Initiator Based on the Oxidation Adducts of Alkyl-9-BBN." Journal of the American Chemical Society 118.3 (1996): 705-706.
Fedorov, Andrei V. et al., "Remote polymerization of coatings with the release of borane from its amine complex." Journal of Applied Polymer Science 107.1 (2008): 147-152.
Wang, Z. M. et al., "Synthesis of Maleic Anhydride Grafted Polypropylene with High Molecular Weight Using Borane/O2 Radical Initiator and Commercial PP Polymers." Macromolecules 38.22 (2005): 8966-8970.
Welch, F. J. "Polymerization of methyl methacrylate by triethylboron-oxygen mixtures." Journal of Polymer Science 61.171 (1962): 243-252.
Sonnenschein, Mark F., et al. "Physical and Chemical Probes of the Bond Strength between Trialkylboranes and Amines and Their Utility as Stabilized Free Radical Polymerization Catalysts." Macromolecules 39.7 (2006): 2507-2513.
Onak, T., "Organoborane Chemistry—Chapter 4: Four-Coordinate Organoboranes." Academic Press (1975): 136-163.
Sonnenschein, Mark F., et al. "Mechanism of Trialkylborane Promoted Adhesion to Low Surface Energy Plastics." Macromolecules 37.21 (2004): 7974-7978.
Brown, Herbert C. et al., "Initiation rates for autoxidation of trialkylboranes. Effect of a steric factor on the initiation rate." Journal of the Chemical Society D: Chemical Communications 13 (1971): 699-700.
Davies, Alwyn G., et al. "Homolytic organometallic reactions. Part II. The kinetics and rate constants for the autoxidation of organoboron compounds in solution." Journal of the Chemical Society B: Physical Organic (1971): 698-712.
Moran, Anne C., et al. "Spin Trapping Studies of Amine-Stabilized Trialkylborane Free Radical Initiator Systems: Kinetics and Mechanism." Applied Magnetic Resonance 41.2-4 (2011): 295-303.
Fedorov, Andrei V., et al. "New Method to Reduce Oxygen Surface Inhibition by Photorelease of Boranes from Borane/Amine Complexes." Macromolecules 40.10 (2007): 3554-3560.
Okamura, H. et al., "Generation of radical species on polypropylene by alkylborane-oxygen system and its application to graft polymerization." Journal of Polymer Science Part A: Polymer Chemistry 47.22 (2009): 6163-6167.
Denisov, E. T. et al., "Handbook of Free Radical Initiators." Wiley-Interscience, 2003.

(56) References Cited

OTHER PUBLICATIONS

Wilson, Olivia R. et al., "Oxygen tolerant and room temperature RAFT through alkylborane initiation." ACS Macro Letters 7.3 (2018): 370-375.

Qiu, Xing-Ping et al., "Facile and Efficient One-Pot Transformation of RAFT Polymer End Groups via a Mild Aminolysis/Michael Addition Sequence." Macromolecular Rapid Communications 27.19 (2006): 1648-1653.

Ligon, S. C. et al., "Strategies to Reduce Oxygen Inhibition in Photoinduced Polymerization." Chemical Reviews 114.1 (2014): 557-589.

Shkapenko, George et al.,"Mechanism of the Water-Isocyanate Reaction." Industrial & Engineering Chemistry 52.7 (1960): 605-608.

Hill, Megan R. et al., "Expanding the Scope of RAFT Polymerization: Recent Advances and New Horizons." Macromolecules 48.16 (2015): 5459-5469.

Gody, Guillaume, et al. "Rapid and quantitative one-pot synthesis of sequence-controlled polymers by radical polymerization." Nature Communications 4.1 (2013): 2505.

Sonnenschein, Mark F., et al. "Colloidal Encapsulation of Hydrolytically and Oxidatively Unstable Organoborane Catalysts and Their Use in Waterborne Acrylic Polymerization" Langmuir 25.21 (2009): 12488-12494.

Sun, Xiao-Li, et al. "RAFT Cryopolymerizations of N, N-dimethylacrylamide and N-isopropylacrylamide in Moderately Frozen Aqueous Solution." Journal of Polymer Science Part A: Polymer Chemistry 47.24 (2009): 6863-6872.

\* cited by examiner

OXYGEN TOLERANT AND ROOM TEMPERATURE RAFT THROUGH ALKYLBORANE INITIATION

CROSS REFERENCE TO RELATED APPLICATIONS

This application claims the benefit of U.S. Provisional Application No. 62/805,702, filed on Feb. 14, 2019 and the benefit of U.S. Provisional Application No. 62/637,668, filed Mar. 2, 2018, both of which applications are hereby incorporated herein by reference in their entirety.

BACKGROUND OF THE INVENTION

Robust reversible-deactivation radical polymerizations (RDRP) capable of being performed under convenient and ambient reaction conditions have become the focus of significant research efforts, as such processes enable broader droves of scientists to readily access well-defined and sophisticated polymeric architectures. In particular, an ideal polymerization could be readily carried out at room temperature, in the presence of oxygen, and with rapid polymerization rates, while maintaining the attractive structural control and versatility offered via RDRP. Many polymerization systems have been developed in this prolific research field, exhibiting various levels of these ideal characteristics with both atom transfer radical polymerization[1-6] and reversible addition-fragmentation chain transfer (RAFT).[7-10]

Robust, ambient temperature, and oxygen tolerant RAFT polymerizations have recently witnessed significant advancement exemplified by the many developments of enzyme catalyzed RAFT[10-12] and photo-induced electron transfer (PET)-RAFT processes. An initial account by Stevens et al. demonstrated enzymatic deoxygenation of RAFT with glucose oxidase, an enzyme capable of converting oxygen into hydrogen peroxide, allowing well-controlled RAFT polymerizations to be conducted in open reactors using a range of solvents and monomers.[10] This ideology was extended to a coenzyme catalyzed RAFT process capable of deoxygenation and radical generation through a cascade reaction using pyranose oxidase and horseradish peroxidase, respectively.[12] Through this approach, the authors successfully synthesized multi-block copolymers within reaction vessels completely open to the atmosphere and synthesized ultra-high molecular weight polymers in the presence of limited amounts of oxygen at room temperature.

Suitable conditions, chain transfer agents, solvents, and initiators for RAFT polymerization are described in, for example, WO 98/01478, U.S. Pat. No. 6,596,899 and U.S. patent application publication no. US 2003/0199653 A1, the disclosure of which is hereby incorporated by reference for including these features in the present application.

PET-RAFT is another particularly versatile, robust, and convenient polymerization system that has been demonstrated to be tolerant to oxygen and capable of operating at room temperature through a variety of mechanistic pathways. Early reports by Boyer et al. on PET-RAFT with metal catalysts were shown to be tolerant to oxygen by reducing $O_2$ to an inert $O_2$ form via electron-transfer, which afterward resulted in well-controlled polymerizations with[9,13] and without inhibition periods.[14] Ambient temperature and oxygen tolerant PET-RAFT was also demonstrated using organic photo-redox catalysts in combination with ascorbic acid or triethylamine,[15-17] or by taking advantage of the intrinsic photo-catalytic properties of chain transfer agents in the presence of a sacrificial tertiary amine.[8] Other interesting approaches have employed a monomer reactive toward oxygen which completely eliminated inhibition under ambient conditions,[18] or a strategy that utilized graphitic carbon nitride as a photo-catalyst to reduce oxygen enabling PET-RAFT without prior deoxygenation.[19] The versatility of PET-RAFT is further showcased by literature accounts detailing its ability to polymerize uncommon monomers (e.g. vinyl ketones),[20] synthesize thermo-responsive gels,[21] and its adaptation to polymerization-induced self-assembly,[22] all of which can be carried out at room temperature in the presence of oxygen.

Suitable conditions, initiators and atom transfer agents for atom transfer radical polymerization (ATRP) are described in, for example, US 2009/0312505 A1 and U.S. Pat. No. 5,312,871, the disclosure of which is hereby incorporated by reference for including these features in the present application.

Organoborane complex initiators are disclosed in U.S. Pat. No. 6,762,260 and WO 2015/148319 A1, the disclosure of which is hereby incorporated by reference for including suitable polymerization conditions and monomers in the present application. The disclosures of these documents are also specifically incorporated by reference for details on the provision of oxygen or another suitable oxidizing agent to the reaction mixture and/or for reaction with the alkylborane complex.

SUMMARY OF THE INVENTION

In one aspect, the present invention may be directed to a method of preparing a polymer comprising steps of polymerizing a radically polymerizable monomer in a polymerization medium comprising: (a) a chain transfer agent, and (b) a free radical initiator prepared by oxidizing a reaction product of a ligand-reactive decomplexation agent and an alkyl-borane complex of the formula:

wherein $R_1$, $R_2$, and $R_3$ are independently selected from hydrogen, an alkyl group containing from 1 to 12 carbon atoms, a cycloalkyl group containing from 3-12 carbon atoms, and an aryl group containing from 6 to 12 carbon atoms, wherein the aryl group may be optionally substituted with an alkyl group having from 1 to 10 carbon atoms, and at least one of $R_1$, $R_2$, and $R_3$ is an alkyl group, a cycloalkyl group or an aryl group, and L is a complexing agent selected from one or more amine groups, amidine groups, hydroxide groups, alkoxyl groups, alkyl ether groups, alkoxide groups and mixtures thereof.

In the foregoing embodiment, the ligand-reactive decomplexation agent may comprise at least one of an organic acid, inorganic acid, carboxylic acid, an acid anhydride, a thiol, an alcohol, an aldehyde, an isocyanate, a phosphonic acid, and a 1,3-dicarbonyl. Preferably, the ligand-reactive decomplexation agent may be selected from isophorone diisocyanate, toluene diisocyanate, diphenylmethane diisocyanate, acetic acid, trifluoroacetic acid, acrylic acid, propionic acid, methacrylic acid, acrylic acid, and ammonia.

In each of the foregoing embodiments, $R_1$, $R_2$, and $R_3$ may be independently selected from an alkyl group containing from 1 to 10 carbon atoms, or from 1 to 4 carbon atoms.

In each of the foregoing embodiments, $R_1$, $R_2$, and $R_3$ may be selected from alkyl groups containing from 1 to 10 carbon atoms and L may be selected from an amine selected from a primary amine, a secondary amine, a tertiary amine, and a polyamine having primary and/or secondary amino groups and mixtures thereof.

In each of the foregoing embodiments, the alkyl-borane complex may be an alkyl-borane amine-complex of the formula (II):

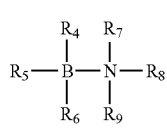

wherein $R_4$, $R_5$, and $R_6$ are independently selected from hydrogen, an alkyl group containing from 1 to 12 carbon atoms and an aryl group containing from 1 to 12 carbon atoms, at least one of $R_4$, $R_5$, and $R_6$ is an alkyl group or an aryl group, and $R_7$, $R_8$, and $R_9$ are independently selected from hydrogen, and an optionally substituted alkyl group containing from 1 to 12 carbon atoms, wherein each said alkyl group $R_7$, $R_8$, and $R_9$ may be optionally substituted with one or more of halo groups, alkoxy groups, mercapto groups, nitro groups, nitroso groups, sulfoxy groups, pyridyl groups, furyl groups, thienyl groups, imidazoyl groups, and sulfur, with the proviso that not more than two of $R_7$, $R_8$, and $R_9$ are simultaneously hydrogen. Preferably, $R_7$ and $R_9$ are hydrogen, and $R_8$ is an alkyl group containing 1 to 10 carbon atoms and is optionally substituted with an alkoxy group. In preferred embodiments, the alkyl-borane amine-complex is selected from tri-n-butylborane methoxypropylamine, tri-ethylborane-diethylenetriamine, and 1,3-propanediamine-triethylborane.

In each of the foregoing embodiments, the monomer may be polymerized via reversible-addition fragmentation chain-transfer (RAFT).

In each of the foregoing embodiments, the monomer may be present in an amount of 5 to 99 wt. % based on the total weight of the polymerization medium.

In each of the foregoing embodiments, the polymerization medium may further comprise a solvent. In the foregoing embodiment, the solvent may be present in an amount of 1-99 wt. % based on the total weight of the polymerization medium.

In each of the foregoing embodiments, the polymerization medium may further comprise water, and the monomer may be polymerized by a process selected from suspension polymerization, emulsion polymerization, miniemulsion polymerization, and microemulsion polymerization.

In each of the foregoing embodiments, the polymerization medium may be devoid of a solvent.

In each of the foregoing embodiments, the free radical initiator may be added to the polymerization process initially, gradually, sequentially, or continuously during the polymerization.

In each of the foregoing embodiments, the reaction product may be oxidized by oxygen. In the foregoing embodiment the polymerization medium may comprise a molar ratio of moles of oxygen to moles of alkyl borane amine complex used for preparing the free radical initiator of from 0.1:1 to 20:1, and excesses of oxygen created during polymerizations performed at 0°–45° C. and pressures of 0.9-1.1 atmospheres In each of the foregoing embodiments, the chain transfer agent may be selected from dithioesters, dithiobenzoates, trithiocarbonates, dithiocarbamates, disulphides, xanthate disulphides, dithiocarbonates, and xanthates. Preferably, the chain transfer agent is selected from methyl 2-(dodecylthiocarbonothioylthio)-2-methylproprionate (MDMP), 2-(dodecylthiocarbonothioylthio)-2-methylpropionic acid (DMP), and 2-cyano-2-propyl dodecyl trithiocarbonate (CPDT).

In each of the foregoing embodiments, the radically polymerizable monomer may be selected from the group consisting of (meth)acrylate esters of $C_1$-$C_{20}$ alcohols, acrylonitrile, cyanoacrylate esters of $C_1$-$C_{20}$ alcohols, didehydromalonate diesters of $C_1$-$C_6$ alcohols, vinyl pyridines, vinyl N—$C_1$-$C_6$-alkylpyrroles, vinyl oxazoles, vinyl thiazoles, vinyl pyrimidines, vinyl imidazoles, vinyl acetate, vinyl ether, vinyl sulfide, styrene, ketones, acrylamide, methacrylamide, acrylate, (meth)acrylate, vinyl ketones, styrene, methyl (meth)acrylate, butyl acrylate, and 2-ethylhexyl acrylate monomers and mixtures of two or more of said monomers. Preferably the radically polymerizable monomer is selected N,N-dimethylacrylamide (DMA), tert-butyl acrylate (tBA), methyl methacrylate (MMA), N-isopropylacrylamide (NIPAM), acrylates, methacrylates, acrylamide, methacrylamides, vinyl acetate, ethylene, propylene, styrene, vinylidene chloride, vinylidene fluoride, butadiene, methyl methacrylate, 4-vinyl pyridine, N-vinyl carbazole, vinyl chloride, vinyl fluoride and tetrafluoroethylene. In some embodiments, the radically polymerizable monomer may include two more polymerizable moieties, wherein the polymerizable moieties may be selected from the polymerizable moieties described in relation to the monomers disclosed in the foregoing embodiment.

In each of the foregoing embodiments, the polymerization may be carried out at a temperature of from 0° C. to 100° C., or from 5° C. to 45° C.

In each of the foregoing embodiments, the polymerization may be carried out at a pressure of 0.9 to 1.1 atmospheres, or at a pressure above one atmosphere.

In each of the foregoing embodiments, the free radical initiator may be prepared in situ as a result of the alkyl-borane amine complex removing oxygen from the polymerization medium.

In one aspect, the present invention may be directed to a polymer prepared by the method of each of the foregoing embodiments.

In the foregoing embodiment, the polymer may have a polydispersity index (Mw/Mn) of 3 or less or a polydispersity index of 1.2-3.0, as determined by gel permeation chromatography. Preferably, the polymer may have a polydispersity index of 2.5 or less or from 1.2-25, or 1.5 or less or from 1.2 to 1.5.

In each of the foregoing embodiments, the polymer may be selected from a linear polymer, a block copolymer, a star copolymer, a hyperbranched copolymer, a crosslinked network polymer, and a crosslinked gel polymer.

In each of the foregoing embodiments, the polymer may have a molecular weight of from 1,500 to 4,000,000 g/mol, or from 5,000-2,000,000 g/mol, or from 20,000 to 500,000 g/mol, as determined by gel permeation chromatography.

In each of the foregoing embodiments, the polymer may be generated from sequential addition of one or more monomers selected from the group consisting of (meth) acrylate esters of $C_1$-$C_{20}$ alcohols, acrylonitrile, cyanoacrylate esters of $C_1$-$C_{20}$ alcohols, didehydromalonate diesters of $C_1$-$C_6$ alcohols, vinyl pyridines, vinyl N—$C_1$-$C_6$-alkylpyrroles, vinyl oxazoles, vinyl thiazoles, vinyl pyrimidines, vinyl imidazoles, vinyl acetate, vinyl ether, vinyl sulfide, styrene, ketones, acrylamide, methacrylamide, acrylate, (meth)acrylate, vinyl ketones, styrene, methyl (meth)acrylate, butyl acrylate, and 2-ethylhexyl acrylate monomers and mixtures of two or more of said monomers. Preferably the radically polymerizable monomer is selected from N,N-dimethylacrylamide (DMA), tert-butyl acrylate (tBA), methyl methacrylate (MMA), N-isopropylacrylamide (NIPAM), acrylates, methacrylates, acrylamide, methacrylamides, vinyl acetate, ethylene, propylene, styrene, vinylidene chloride, vinylidene fluoride, butadiene, methyl methacrylate, 4-vinyl pyridine, N-vinyl carbazole, vinyl chloride, vinyl fluoride and tetrafluoroethylene. In some embodiments, the radically polymerizable monomer may include two more polymerizable moieties, wherein the polymerizable moieties may be selected from the polymerizable moieties mentioned for the monomers disclosed in the foregoing embodiment(s).

BRIEF DESCRIPTION OF THE DRAWINGS

FIG. 2A shows size exclusion chromatography (SEC) traces from radical polymerizations conducted in the absence and presence of a chain transfer agent (CTA) designated as free radical polymerization (FRP) and AI-RAFT, respectively.

FIG. 2B shows AI-RAFT conducted using a range of degrees of polymerization (DPtheo) values, and their experimentally determined degrees of polymerization (DPexp) and dispersity values (Ð). The solid black line represents DPtheo=DPexp. All polymerizations had monomer conversion (p) values >70% and were formulated using 40 wt. % dimethylacrylamide (DMA) with [DMA]/[BR3−L]/[COOH]=3.74/0.011/.175 for 18 hours. DPexp=Mn,SEC/MWDMA, whereas DPtheo=p·[DMA]/[CTA].

FIG. 2C shows corresponding SEC traces from each polymerization reported in FIG. 2B.

FIG. 3A shows monomer conversion as a function of time during AI-RAFT polymerization deblocked with PA or IRDI.

FIG. 3B shows a first-order kinetic plot within the linear region of PA and IPDI polymerization systems, and the corresponding $k_{app}$ determined from a linear fit of the data.

FIG. 3C shows poly(DMA) number-average molecular weight and dispersity versus conversion during AI-RAFT deblocked using PA or IPDI. M _(n,theo)=MW_DMA× ([DMA]/[CTA])×p+MW_CTA. All of the polymerizations were conducted using 40 wt. % DMA and formulated using [DMA]/[CTA]/[BR3−L]/[COOH or NCO]=700/1/2/32.

FIGS. 8A-8C show SEC traces after chain-extension of poly(DMA) macro-CTAs during thermal initiated RAFT.

FIGS. 8D-8F show SEC chromatograms with deconvoluted peaks of macro-CTA and block copolymer used to calculate blocking efficiencies. Deconvolution was performed using Gaussian distributions. Blocking efficiency was calculated as Beff=1−(Area Initial,Macro-CTA/Area Final, Macro-CTA).

FIG. 8D shows a blocking efficiency (Beff) of 29%, determined from Area Initial Macro-CTA=3059, and Area Final Macro-CTA=2173.

FIG. 8E shows a blocking efficiency (Beff) of 58%, determined from Area Initial Macro-CTA=204, and Area Final Macro-CTA=485.

FIG. 8F shows a blocking efficiency (Beff) of 74%, determined from Area Initial Macro-CTA=310, and Area Final Macro-CTA=82.

DETAILED DESCRIPTION OF EMBODIMENTS OF THE INVENTION

Figure 1:
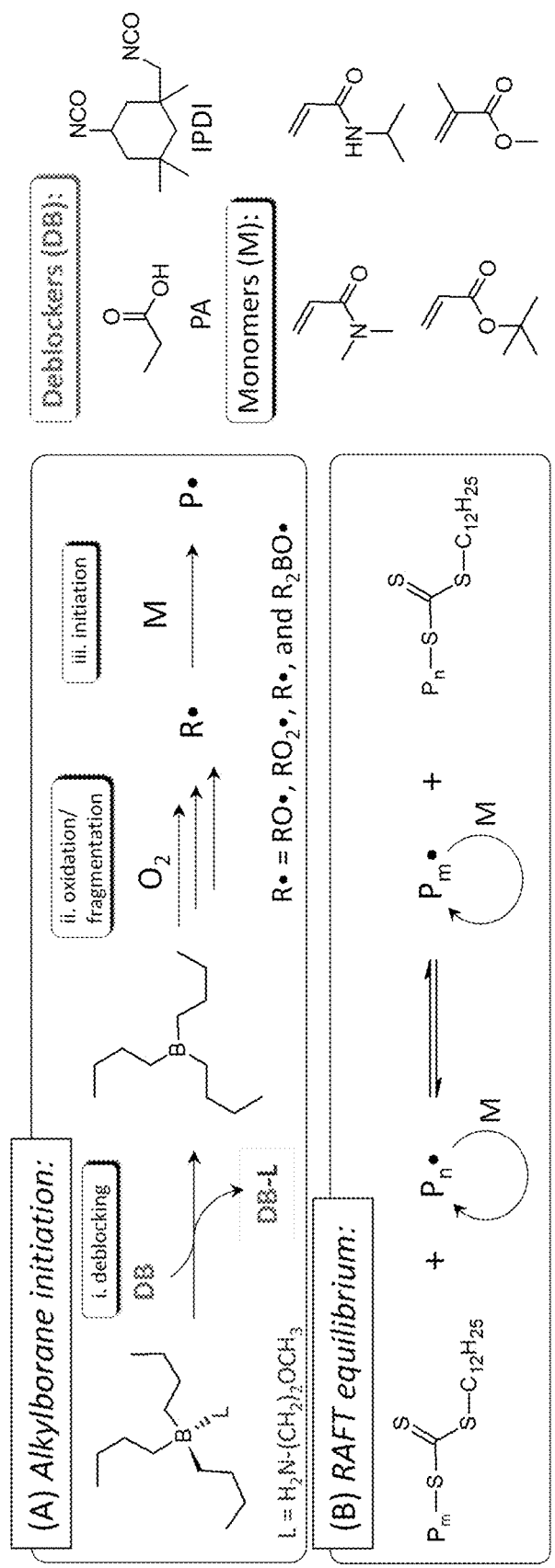
FIG. 1 shows a mechanism of alkylborane initiated—reversible addition—fragmentation chain transfer (AI-RAFT). Step A) shows alkylborane initiation, which includes (i) decomplexation of an alkylborane-amine complex with deblocker, (ii) primary radical formation after oxidation/fragmentation reactions of alkylborane, and (iii) initiation by addition of primary radicals to monomer. Step B) shows the main RAFT equilibrium and propagation of the monomer.

In view of the previously discussed literature and a recent report by Ahn et al.,[23] the present invention is designed to provide another strategy for potentially achieving room temperature and oxygen tolerant RDRP was by initiating RAFT polymerization through alkylboranes (Figure. 1). Alkylboranes (BR3) are well-known free radical initiators which uniquely consume oxygen to generate radicals,[24-27] thus providing a means to simultaneously remove 02 from a reaction vessel while generating essential radicals for polymerization. Alkylboranes alone are electron deficient and pyrophoric species, but can be converted into air-stable complexes (BR3-L) by coordination with an electron donating ligand (L).[28, 29] Vast $BR_3$-L complexes are readily accessible through various coordinating ligands, e.g. ethers and amines, and numerous BR3 compounds, e.g. R=methyl, ethyl, and butyl, granting access to a rich chemistry of complexes with tunable borane-amine bond strengths, stabilities, and properties.[28]

Free radicals (R.) can be produced from alkylborane-amine complexes at room temperature by addition of a ligand-reactive decomplexation agent referred to herein as a deblocker (DB). Deprotection of the air-stable BR3-L complex occurs in-situ liberating the active BR3 initiator, and generating its corresponding deblocker-ligand reaction byproduct (DB-L) (FIG. 1, (A), i).[23] Subsequently, in the presence of oxygen, alkylboranes readily oxidize to create intermediate alkylborane peroxide adducts by insertion of oxygen between the boron and carbon bond, which thereafter, fragment through multiple reactions into primary radicals (FIG. 1, ii). The generated radicals consist of various oxygen and carbon centered radicals, e.g. alkoxy, peroxy, alkyl and borinate radicals, some of which are capable of initiating radical polymerization (FIG. 1, iii).[28, 30] Various reaction mechanism have been proposed for the generation of radicals through alkylboranes,[27, 30-32] however prior accounts give impetus in support of the Welsh mechanism.[27, 30, 33] While alkylboranes have been explored industrially for free radical polymerization, adhesion, and coatings,[23, 34, 35] the present invention is the first to employ alkylborane initiation to induced RDRP, specifically RAFT, at room temperature in the presence of oxygen.

A reversible addition-fragmentation chain transfer (RAFT) process was developed capable of being performed at room temperature and in the presence of oxygen by initiating polymerization through an alkylborane-amine complex. This air-stable alkylborane-amine complex was chemically deblocked with carboxylic acid or isocyanate functionalities to liberate a reactive alkylborane that consumes oxygen and generates radicals to drive the RAFT process. Alkylborane initiated RAFT (AI-RAFT) was demonstrated to allow specific molecular weights to be targeted while maintaining narrow molecular weight distributions over a wide range of degrees of polymerization. In specific conditions, rapid polymerization was possible within minutes under an ambient environment, without any prior deoxygenation, yielding moderate monomer conversion and narrow dispersity polymer. Conditions for conducting AI-RAFT were determined using propionic acid and isophorone diisocyanate showing that carboxylic acids, versus isocyanates, require a larger excesses of deblocker to alkylborane to promote high monomer conversion. The functionality of the deblocker was also observed to have an impact on polymerization kinetics, and in some cases, to influence the dispersity and achievable molecular weight. The retention of living chain-ends was confirmed by synthesizing block copolymers using AI-RAFT derived macro-chain transfer agents, which were found to most efficiently chain-extend when synthesized using lower concentrations of alkylborane initiator. In this preliminary study, AI-RAFT was found to be an effective tool for polymerizing acrylamide, acrylate, and methacrylate monomers at room temperature within limited amounts of oxygen, and introduces a versatile RAFT process induced through chemical means without application of any external thermal, photochemical, electrical, or mechanical stimulus.

Figure 6:
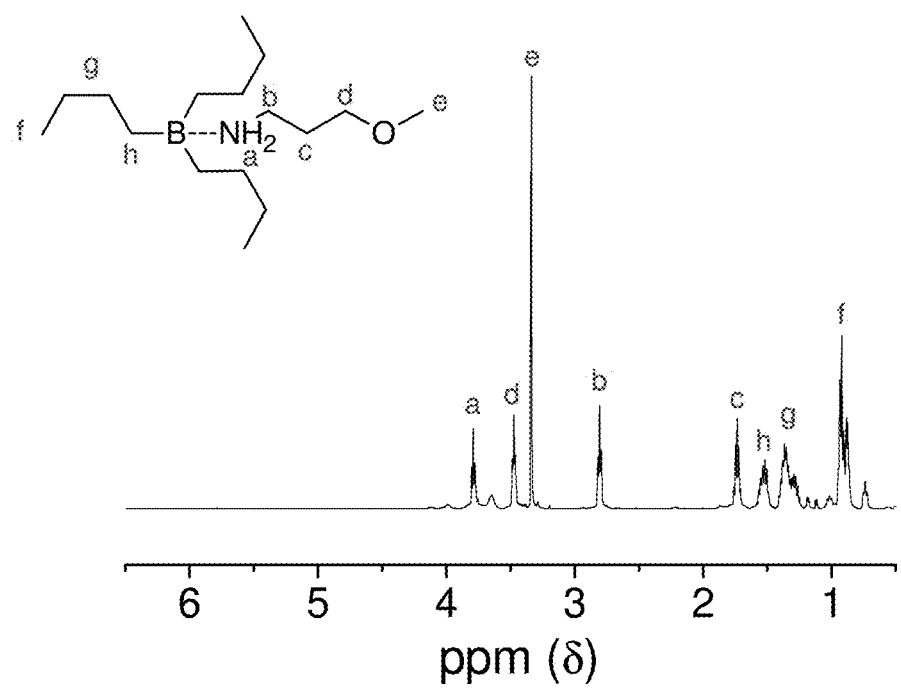
FIG. 6 shows an H NMR spectrum of the TgBB-MOPA alkylborane-amine complex. Peak assignments were made from literature and using Marvin Sketch predictive software[43].$CDCl_3$ was used at the NMR solvent.
Figure 7:
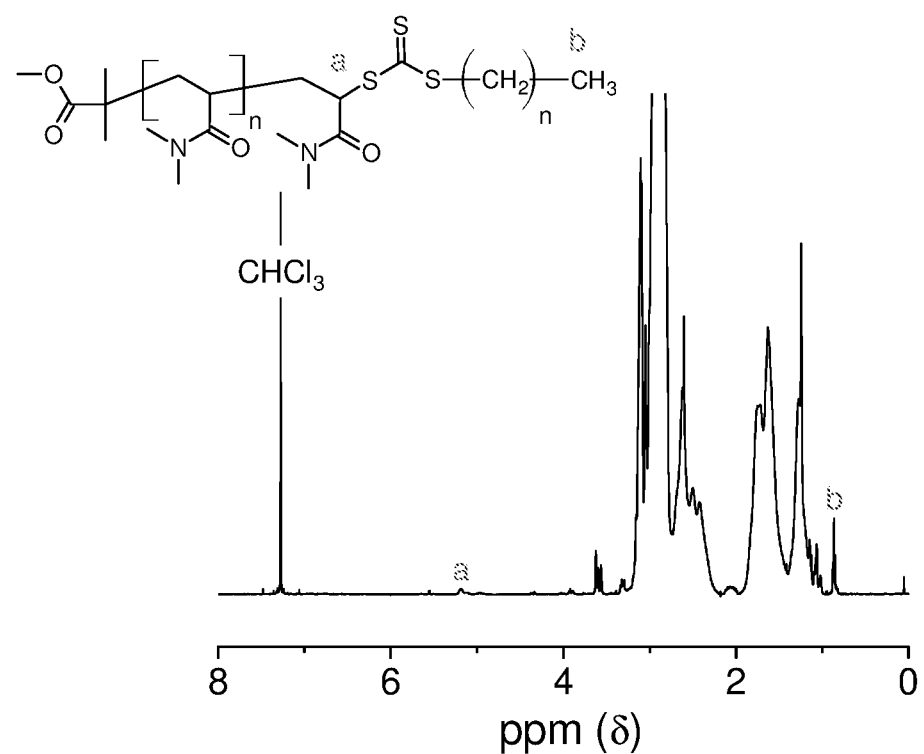
FIG. 7 shows H NMR of poly(DMA) macro-CTA synthesized by AI-Raft. Peak assignments were made from using literature[44].
Figure 8A:
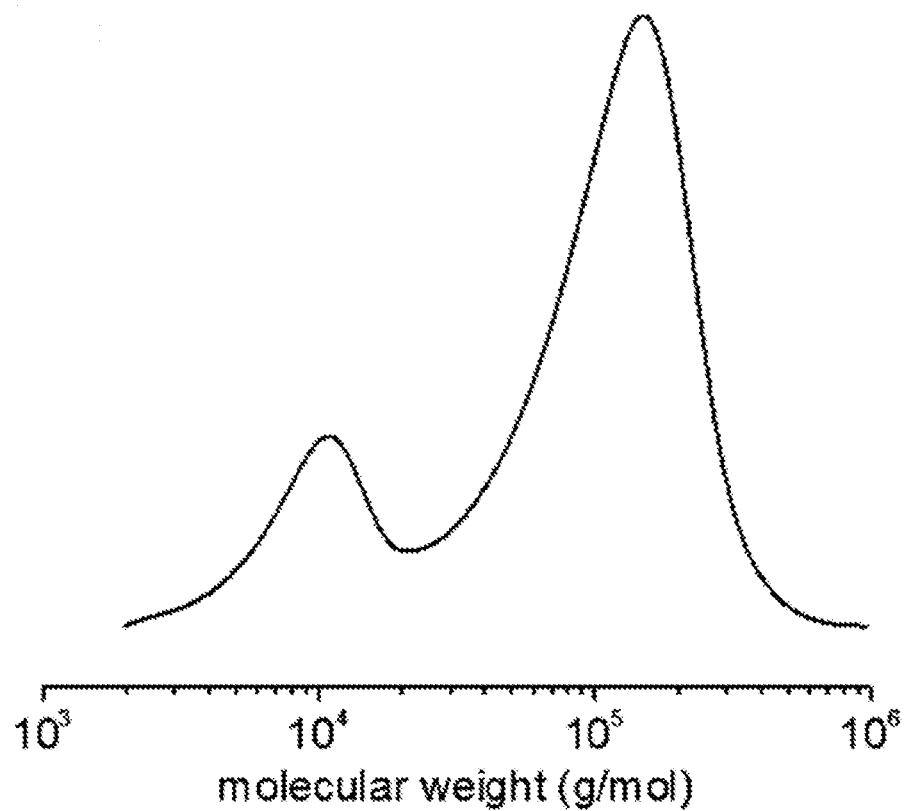
FIGS. 8A-8F show SEC and deconvolution data of chain extensions by RAFT.
Figure 8B:
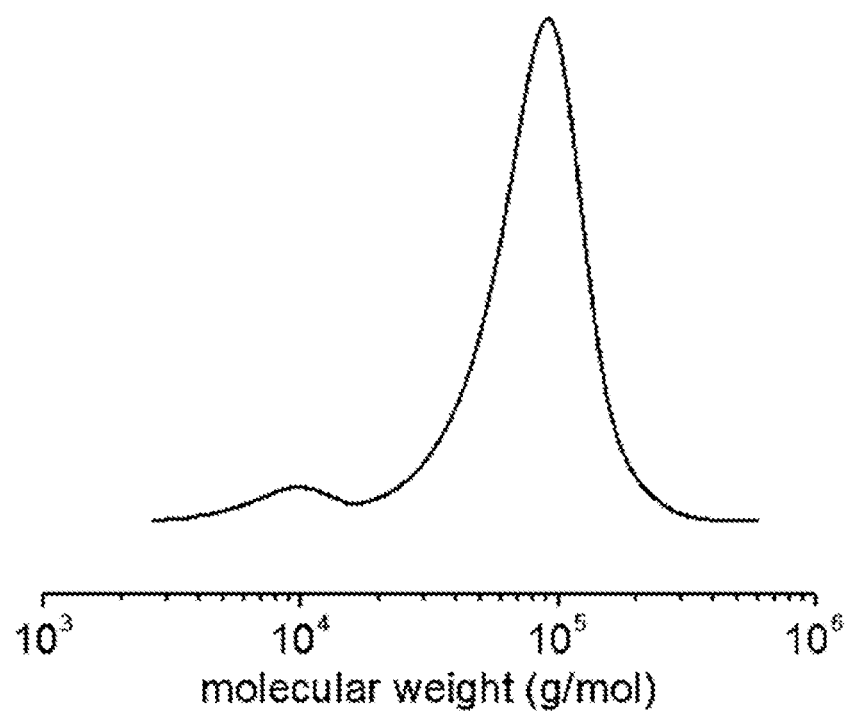
Figure 8C:
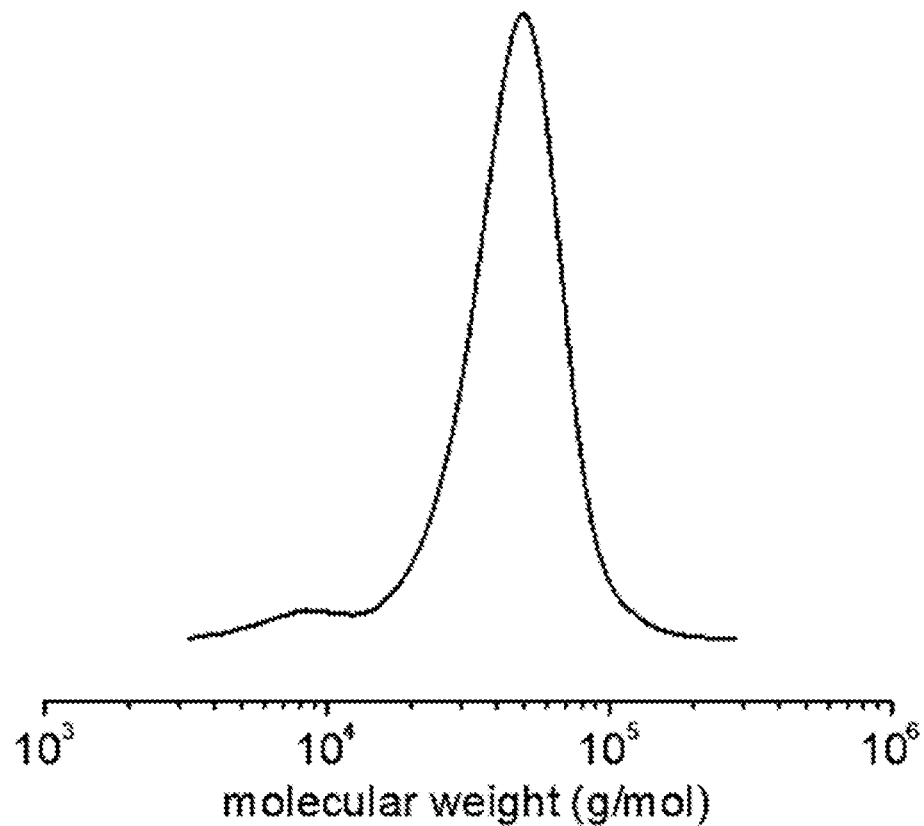
Figure 8D:
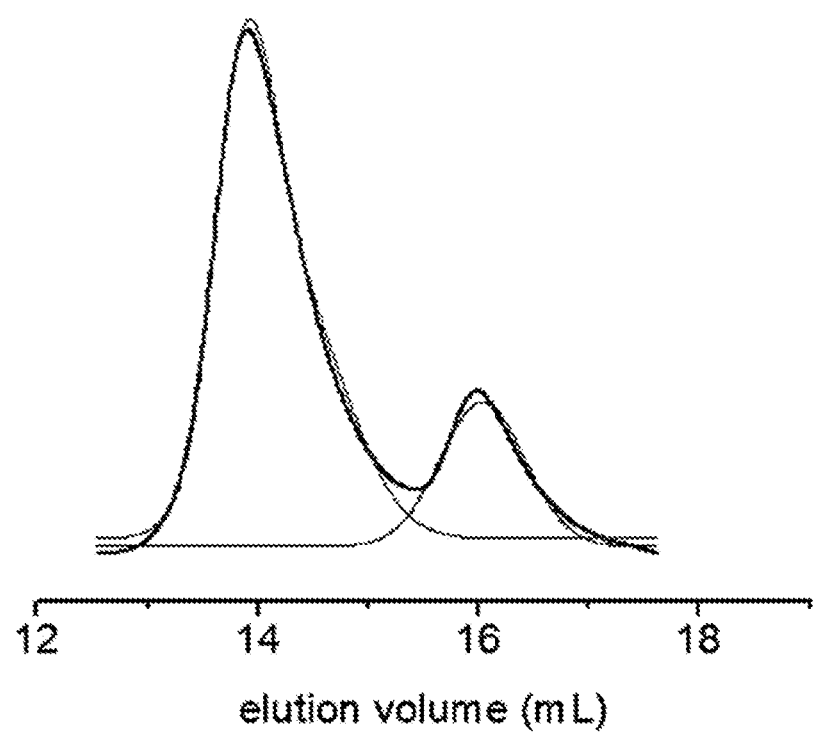
Figure 8E:
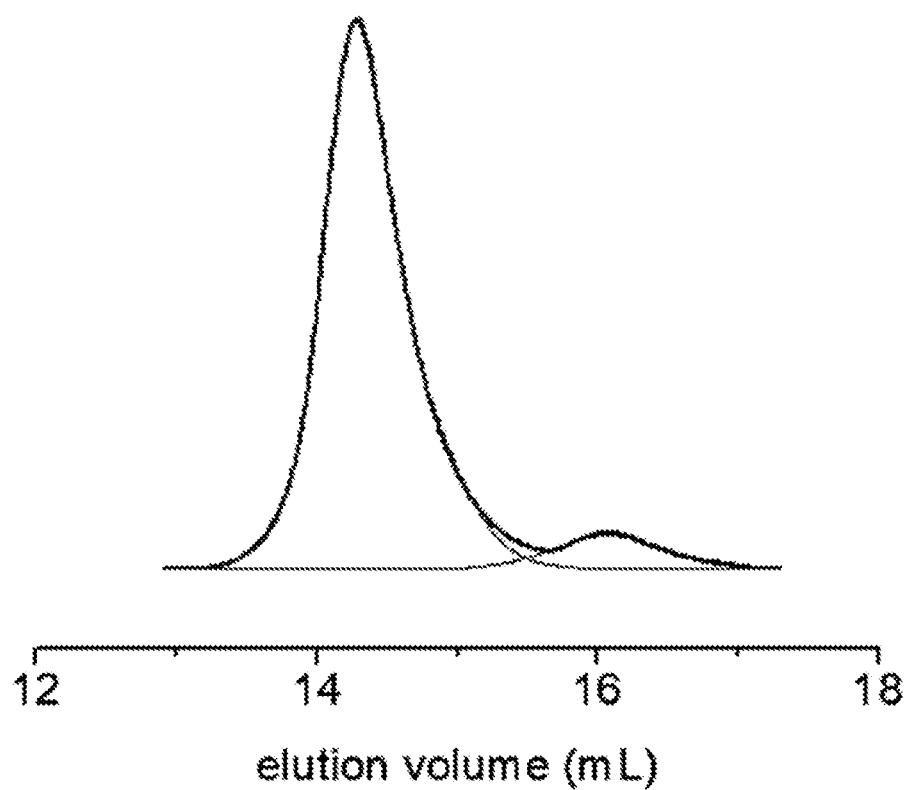
Figure 8F:
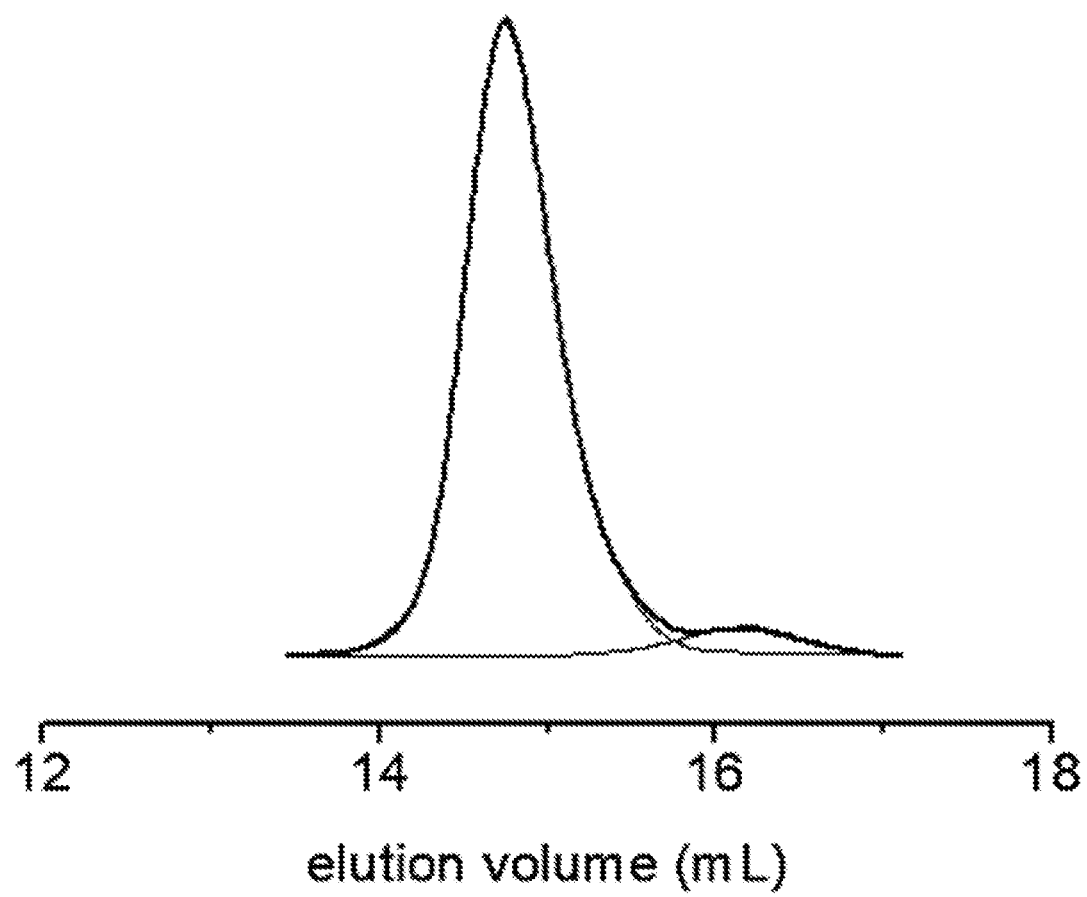

Herein, alkylborane initiated RAFT (AI-RAFT) is described for use as a polymerization system capable of exploiting the narrow polydispersities, molecular weight control, and defined chain-ends of RDRP; while taking advantage of the oxygen tolerance, room temperature radical generation, and rapid polymerization rates of alkylborane initiation. Initiation of RAFT with tri-n-butylborane methoxypropylamine ($T_n$BB-MOPA), as the BR3-L complex, by reacting it with propionic acid or isophorone diisocyanate, the DB, to produce an active tributylborane initiator and its respective amide/urea byproduct, i.e. DB-L is demonstrated. A trithiocarbonate chain transfer agent (CTA, methyl-2-(dodecylthiocarbonothioylthio)-2-methylpropionate, was employed in all exemplified RAFT polymerizations unless specified otherwise, and the employed BR3-L complex was obtained from a commercial supplier or synthesized readily (see Table 1 and FIG. 6). Various polymerizations were conducted at room temperature within limited amounts of oxygen to: (a) explore general conditions for conducting AI-RAFT, (b) assess the capabilities of AI-RAFT under atmospheric conditions, and (c) evaluate the scope of AI-RAFT to synthesize block copolymers and to polymerize acrylamide, acrylate, and methacrylate monomers (FIG. 1).

EXAMPLES

Figure 2A:
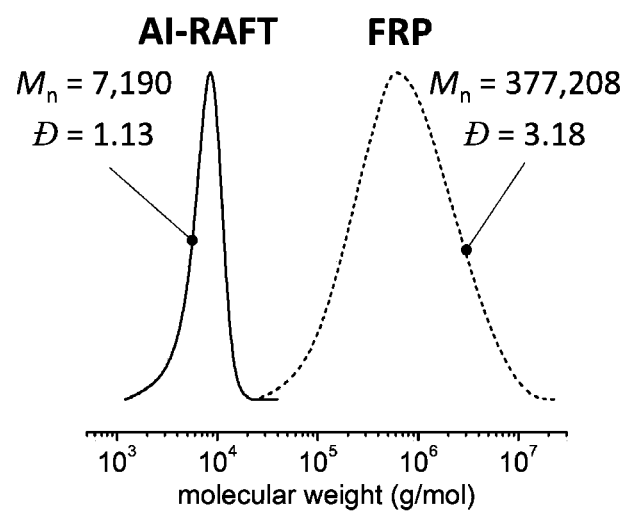
FIGS. 2A-2C show data from room temperature alkylborane initiated polymerizations deblocked with propionic acid.

This example confirms that solution free radical polymerization (FRP) was possible, and then, polymerizations in the presence of CTA intended to mediate RAFT. Alkylboranes are known to produce various radical species with very different reactivities,[30, 36, 37] which could interfere with efficient chain transfer required for an ideal RAFT process. Furthermore, the primary amine complexed with the alkylborane could participate in aminolysis reactions with CTAs, or trithiocarbonate end-groups, rendering a fraction of chains inactive.[38] FRP was first pursued at room temperature with N,N-dimethylacrylamide (DMA) in ethyl acetate using modified conditions to those reported in literature.[23] Initial polymerizations were formulated to have 90 mM of the alkylborane-amine complex in a 40 wt. % DMA solution. Once formulated, only DMA and BR3-L were deoxygenated by sparging with $N_2$. Polymerization was then initiated by addition of oxygenated deblocker solution, in this case propionic acid (PA) in ethyl acetate, using a 2:1 molar ratio of PA to BR3-L. This experimental protocol was employed to introduce a consistent amount of 02 in all experiments by injecting a constant volume of deblocker solution containing dissolved oxygen. After 6 hours, high molecular weight poly(DMA) was obtained having a number-averaged molecular weight ($M_n$) of ca. 377,000 g/mol and a dispersity (Đ) of 3.18, as shown in FIG. 2A. This free radical polymerization reached quantitative conversion of monomer according to $^1$H NMR analysis. Encouraged by these results, an identical RAFT polymerization was formulated except in the presence of CTA utilizing a molar ratio of [DMA]/[CTA]/[BR3-L]/[PA] of 90/1/2/4. In the presence of CTA, 70% monomer conversion was reached in 18 hours yielding poly(DMA) with a $M_n$ equal to 7,190 g/mol and a narrow Đ of 1.13. These results confirmed that the alkylborane initiation mechanism was suitable for FRP and, for the first time, capable of mediating a room temperature RDRP process conducted in the presence of limited 02.

Figure 2B:
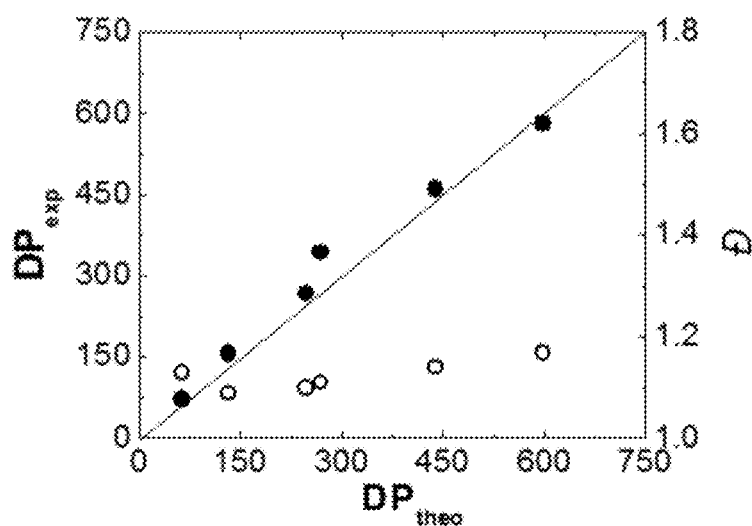
Figure 2C:
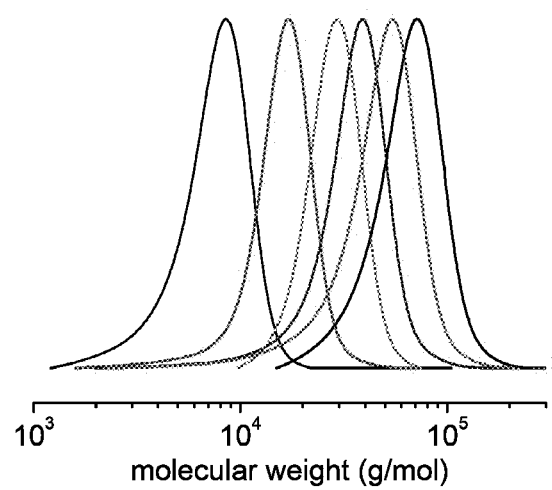

This example is designed to determine whether alkylborane initiation exhibited any adverse effects on RAFT's capability to target a range of molecular weights. To examine this, separate polymerizations were conducted with identical conditions except using different concentrations of CTA to target various degrees of polymerization ($DP_{theo}$), as shown in FIG. 2B. Through this series of experiments, the $DP_{theo}$ was found to linearly increase with respect to the experimentally determined degree of polymerization ($DP_{exp}$) obtained from size exclusion chromatography (SEC). $DP_{exp}$ values were achieved over a wide range from ca. 60 to 600, while maintaining narrow Ð values of less than 1.2 in all cases (FIG. 2B). Inspection of the resulting SEC traces revealed monomodal distributions in all cases without any signs of coupling or significant tailing (FIG. 2C).

Figure 3A:
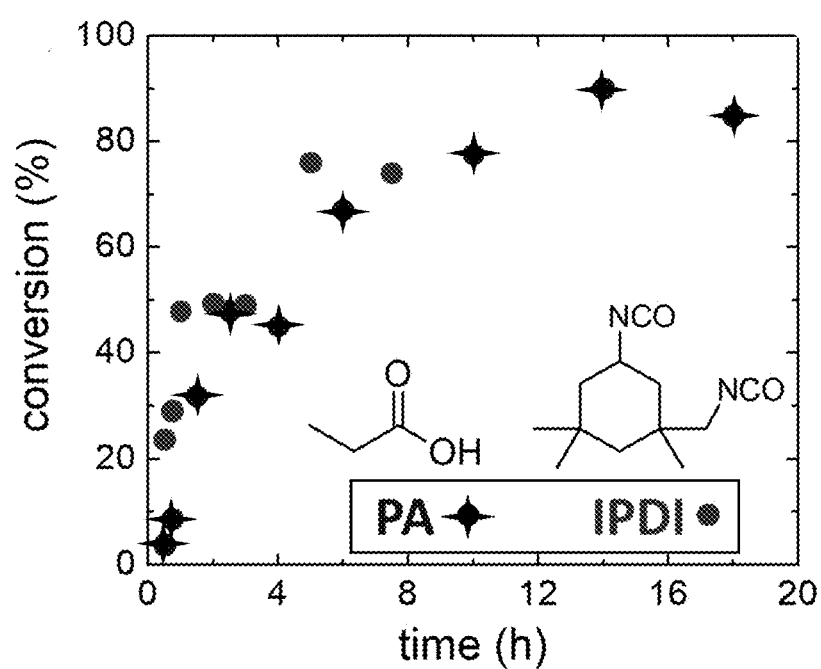
FIGS. 3A-3C show room temperature AI-RAFT using carboxylic acid and isocyanate-based deblockers.
Figure 3B:
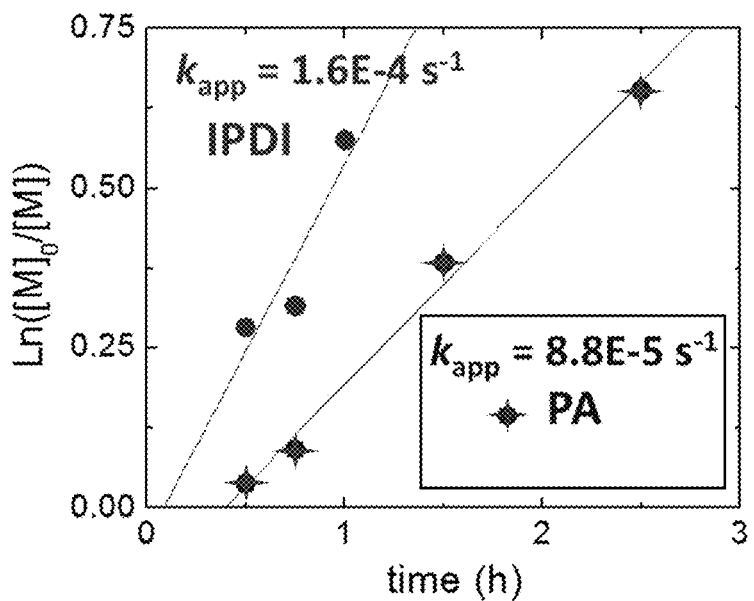

Once molecular weight control was established, the polymerization kinetics and the impact of different deblockers were examined. Based upon prior literature, we expected that the rate of polymerization with all deblockers would be very fast reaching high conversion in minutes,[23] postulated to be a result of rapid deblocking of the alkylborane-amine complex and hence producing a high propagating radical concentration. However, in the exemplified RAFT polymerizations, only 80% monomer conversion was obtained after 10 hours using propionic acid (PA, FIG. 3A). To enhance the polymerization rate, an isocyanate functional deblocker, isophorone diisocyanate (IPDI), which has been shown to cause increased reaction rates[23] was employed. When employing IPDI, the polymerization rate was found to be faster than that of PA, achieving a conversion value of ~50% in 1 hour compared to 2 hours when employing PA. First-order kinetic plots were generated from the monomer conversion data and apparent rate coefficients were extracted from the slope of the linear region. Apparent rate coefficients ($k_{app}$) revealed that polymerizations conducted with IPDI were approximately twice as fast as PA (FIG. 3B). Under these conditions, the data indicates that deblocking is more rapid with isocyanates than carboxylic acids and that deblocking is not an instantaneous process. Furthermore, polymerizations conducted with PA had a 30 minute induction periods, whereas polymerizations performed with IPDI appeared to initiate polymerization with minimal inhibition. The absence of prolonged induction periods was surprising since these polymerizations were conducted in the presence of a limited amount of oxygen, a well-known radical scavenger and inhibitor,[39] emphasizing the advantageous role of an alkylborane initiation system which consumes 02 to generate primary radicals.

Figure 3C:
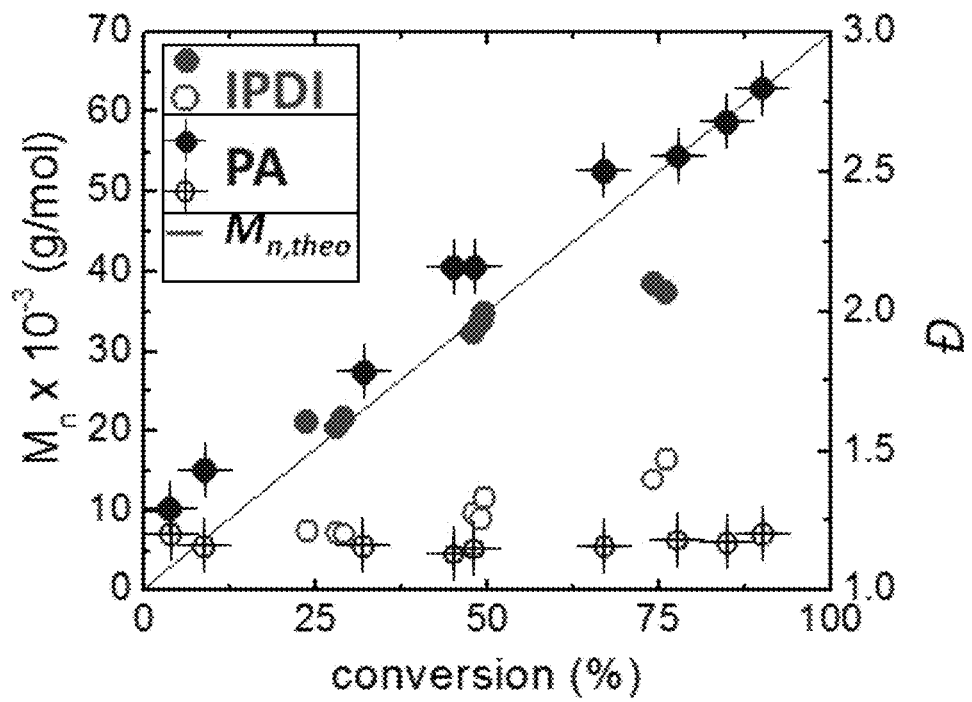

Even though AI-RAFT conducted with PA was observed to have a slightly slower polymerization rate, PA polymerizations resulted in a linear increase in $M_n$ with increasing monomer conversion while maintaining Ð values ≤1.2 over the course of polymerization (FIG. 3C). In contrast, polymerizations utilizing IPDI were found to deviate from the ideal linear relationship between $M_n$ and conversion above 50%, accompanied by a gradual increase in the Ð from 1.21 to 1.47. The loss of molecular weight control and broader dispersities is pronounced when targeting larger DPs, in this case $DP_{theo}$=700, whereas AI-RAFT conducted with IPDI at a $DP_{theo}$=350 resulted in a linear increase in molecular weight with consistently narrow dispersity values (Table 3). This may be a result of chain-end trithiocarbonates being cleaved by primary amines,[38] from residual water reacting with excess isocyanate deblocker during polymerization,[40] leading to a loss of the living chain-ends.

TABLE 3

Summary of formulations and polymers from AI-RAFT with different IPDI concentration.

| Entry | Deblocker | [DMA]/[CTA]/BR$_3$-L]/[NCO] | | | | Conversion (%) | $M_n$, SEC (g/mol) | $M_n$, theo (g/mol) | Ð |
|---|---|---|---|---|---|---|---|---|---|
| 1 | IPDI | 350 | 1 | 1 | 0.3 | 0 | 0 | 0 | n/a |
| 2 | IPDI | 350 | 1 | 1 | 1.0 | 77 | 27,608 | 26,542 | 1.15 |
| 3 | IPDI | 350 | 1 | 1 | 1.9 | 95 | 30,147 | 32,810 | 1.23 |
| 4 | IPDI | 350 | 1 | 1 | 9.5 | 92 | 28,758 | 31,788 | 1.18 |
| 5 | IPDI | 350 | 1 | 1 | 17.1 | 97 | 30,220 | 33,659 | 1.22 |
| 6 | IPDI | 350 | 1 | 1 | 24.7 | 86 | 27,944 | 29,816 | 1.26 |
| 7 | IPDI | 350 | 1 | 1 | 28.5 | 76 | 26,132 | 26,202 | 1.25 | a: Each entry represents an individual polymerization. All polymerizations were conducted at room temperature for 18 hours using 40 wt. % DMA in ethyl acetate. Polymerizations were initiated using 0.5162 mL of ethyl acetate containing deblocker without deoxygenating.
b: Monomer conversion was calculated using $^1$H NMR using trioxane as an internal standard.
c: Theoretical molecular weight was determined as, $M_{n,theo} = MW_{DMA} \cdot ([DMA]/[CTA]) \cdot$ conversion + $MW_{CTA}$.

Figure 4A:
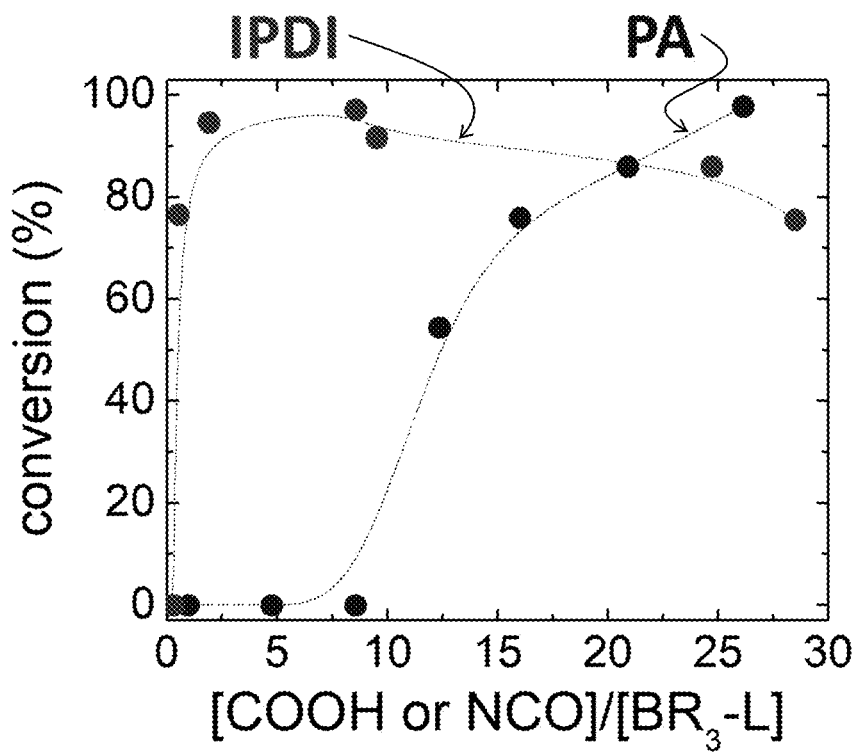
FIG. 4A shows the monomer conversion of AI-RAFT as a function of deblocker concentration reported as the molar ratio of deblocking functional group to alkylborane-amine complex. Each data point represents an individual polymerization conducted for 18 hours using the following molar ratios of [DMA]/[CTA]/[BR3-L]=350/1/1 with 40 wt. % DMA in ethyl acetate.

In previous polymerizations, a large excess of deblocker was employed to ensure that all alkylborane-amine complexes were deblocked and capable of generating primary radicals upon exposure to oxygen (FIG. 1, steps i) and ii)). A new set of experiments were conducted to determine what excess of deblocker to alkylborane-amine complex, i.e. [COOH or NCO]/[BR3-L], was required to promote polymerization to high conversion using PA and IPDI. FIG. 4A shows the results of a series of polymerizations each conducted for 18 hours using a range of deblocker concentrations. When using PA a minimum threshold of [COOH]/[BR$_3$-L]≈10 was required to successfully invoke polymerization. After this point, progressively larger concentrations of PA promoted higher monomer conversions reaching nearly quantitative values at [COOH]/[BR3-L]≥25, while producing poly(DMA) with Ð≤1.25 (Table 1). These results suggest that higher concentrations of PA are required to fully deblock the alkylborane-amine complex by shifting the amidation equilibrium, between the amine ligand and PA, toward products.

TABLE 1

Summary of formulations and polymers from AI-RAFT with different PA concentration.

| Entry | Deblocker | [DMA]/[CTA]/BR$_3$-L]/[COOH] | | | | Conversion (%) | $M_n$, SEC (g/mol) | $M_n$, theo (g/mol) | Đ |
|---|---|---|---|---|---|---|---|---|---|
| 1 | PA | 350 | 1 | 1 | 1.0 | 0 | 0 | 0 | n/a |
| 2 | PA | 350 | 1 | 1 | 4.8 | 0 | 0 | 0 | n/a |
| 3 | PA | 350 | 1 | 1 | 8.6 | 0 | 0 | 0 | n/a |
| 4 | PA | 350 | 1 | 1 | 12.4 | 54 | 20,716 | 18,850 | 1.11 |
| 5 | PA | 350 | 1 | 1 | 16.0 | 76 | 30,188 | 26,334 | 1.22 |
| 6 | PA | 350 | 1 | 1 | 20.9 | 86 | 29,609 | 29,820 | 1.18 |
| 7 | PA | 350 | 1 | 1 | 26.1 | 98 | 31,386 | 33,870 | 1.18 | a: Each entry represents an individual polymerization. All polymerizations were conducted at room temperature for 18 hours using 40 wt. % DMA in ethyl acetate. Polymerizations were initiated using 0.5162 mL of ethyl acetate containing deblocker without deoxygenating.
b: Monomer conversion was calculated using $^1$H NMR using trioxane as an internal standard.
c: Theoretical molecular weight was determined as, $M_{n,theo} = MW_{DMA} \cdot ([DMA]/[CTA]) \cdot conversion + MW_{CTA}$.

Polymerizations conducted with IPDI displayed different behavior than PA. Specifically, isocyanates are more efficient deblockers than carboxylic acids, as monomer conversion values were greater than 90% even when using a small excesses of isocyanate, i.e. [NCO]/[BR$_3$-L]=2 to 10 (FIG. 4A), compared to PA where polymerization did not occur at all. IPDI allowed for high monomer conversions, i.e. p>70%, over a wide range of concentrations ([NCO]/[BR$_3$-L]=2-30) with slightly lower monomer conversions being observed under conditions with a limiting or large excess of isocyanate. Under starved conditions where the deblocker was the limiting reagent, i.e. [NCO]/[BR$_3$-L]<1, conversion values began to decrease when the concentration of isocyanate was insufficient to fully deblock the alkylborane-amine complex. Similarly, when a large excess of isocyanate was employed at [NCO]/[BR$_3$-L]>20, the monomer conversion also decreased which may arise from lower initiation efficiencies caused by rapid deblocking and high radical concentrations in the early stages of polymerization. These studies revealed that for AI-RAFT a large excesses of PA is required for a successful polymerization, whereas similar results can be accomplished with IPDI utilizing a minimal excess or near stoichiometric amounts of deblocker.

Figure 4B:
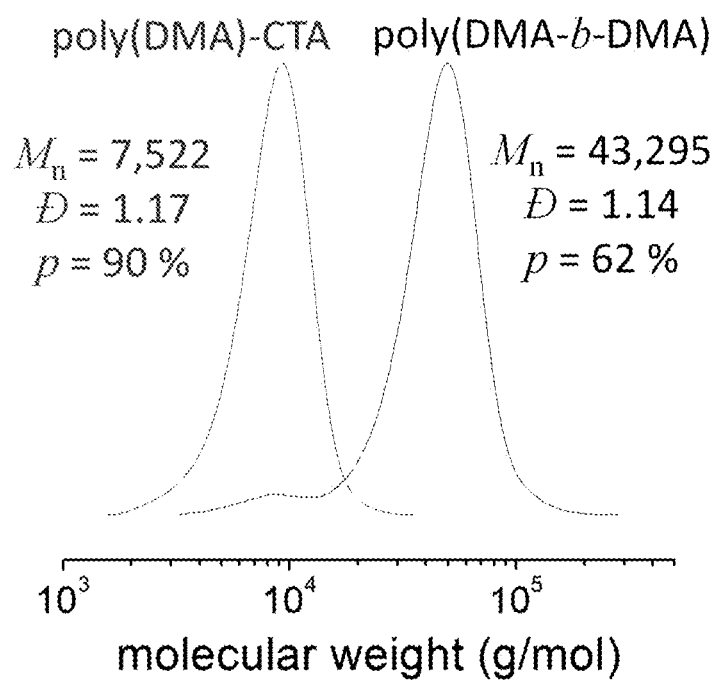
FIG. 4B shows SEC traces of the chain-extension of poly(DMA)-CTA into a poly(DMA-b-DMA) block copolymer. Chain-extension with DMA was conducted via thermal initiated RAFT with AIBN using [DMA]/[CTA]/[AIBN]= 440/1/0.020 and 13 wt. % DMA in DMSO. The macro-CTA was synthesized using AI-RAFT with 10.5 wt. % DMA, for 5 hours, and the following ratios of [DMA]/[CTA]/[BR3-L]/[COOH]=90/1/0.5/52.
Figure 5A:
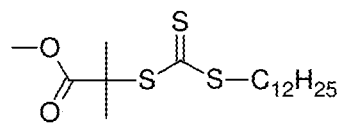
FIG. 5A shows the structure of methyl 2-(dodecylthiocarbonothioylthio)-2-methylproprionate (MDMP).
Figure 5B:
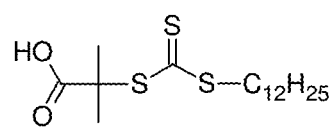
FIG. 5B shows the structure of 2-(dodecylthiocarbonothioylthio)-2-methylpropionic acid (DMP).
Figure 5C:
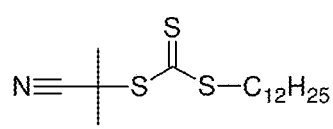
FIG. 5C shows the structure of 2-cyano-2-propyl dodecyl trithiocarbonate (CPDT).

An important aspect in gauging the success of all RDRP processes is the retention of living chain-ends after polymerization. To indirectly assess this feature, chain-extensions were conducted with thermal initiated RAFT from macro-CTAs synthesized via AI-RAFT using three different [CTA]:[BR$_3$-L] ratios of 1:2, 1:1, and 1:0.5 (Table 4). By analyzing the SEC traces after chain-extension and determining the area remaining from residual macro-CTA (FIGS. 8A-8F), the percent of chains which successfully converted to block copolymer were estimated and reported as blocking efficiency ($B_{eff}$) values. As expected, poly(DMA)-CTA synthesized using the lowest amount of initiator, i.e. [CTA]:[BR$_3$-L]=1:0.5, resulted in the most efficient chain-extension with a $B_{eff}$≈75%, while yielding a low dispersity poly(DMA-b-DMA) of 1.14 (FIG. 4B). Macro-CTAs synthesizing with [CTA]:[BR$_3$-L]=1:1 and 1:2 results in lower $B_{eff}$≈30% and 58%, respectively. This trend is consistent with other initiation processes where the livingness, i.e. fraction of chains with trithiocarbonate end-groups, is expected to be larger when employing less initiator.[41,42] These lower $B_{eff}$ values may have resulted from the AI-RAFT polymerizations being conducted with relative high initiator concentrations leading to a [CTA]/[BR$_3$-L]=0.5-2, as opposed to, traditional RAFT polymerizations which typically employ a [CTA]/[AIBN] ratio of 10-20. Furthermore, the peak deconvolution analysis underestimates $B_{eff}$ values because the Gaussian function is unable to accurately describe the tail section of the chain-extended product causing an overestimation of the final macro-CTA area.

The final experiments were designed to investigate if AI-RAFT could be conducted in a reaction vessel under ambient conditions and to evaluate the scope of monomers polymerizable by AI-RAFT (Table 2). In order to successfully achieve AI-RAFT in air, the polymerization was formulated to maximize the polymerization rate by employing near bulk concentrations of monomer and by utilizing a large excess of IPDI (Table 2, Entry 1). Under these conditions, AI-RAFT was incredibly rapid becoming very viscous within 5 minutes and reaching a $M_n$ of 10,300 g/mol. The polydispersity also remained relatively narrow at 1.28, in spite of the fact that the polymerization was conducted without any prior deoxygenation. Three additional polymerizations were conducted to determine the versatility of AI-RAFT in its ability to polymerize N-isopropylacrylamide (NIPAM), tert-butyl acrylate (tBA), and methyl methacrylate (MMA) under conditions summarized in Table 2 (Entries 2-4). With NIPAM and tBA, AI-RAFT proceeded to high monomer conversions while producing poly(NIPAM) and poly(tBA) with narrow dispersity values. MMA was also found to successfully polymerize by AI-RAFT producing poly(MMA) having a polydispersity of 1.26, however, monomer conversion reached only 33% attributed to the low propagation rate coefficient of methacrylates.

TABLE 2

Summary of AI-RAFT in air and with various monomers.

| Entry | Monomer | [M] (wt. %) | [M]/[CTA]/[BR$_3$]/[NCO] | | | | Time | Conversion (%) | $M_n$, SEC (g/mol) | Đ |
|---|---|---|---|---|---|---|---|---|---|---|
| 1[a] | DMA (in air) | 52 | 130 | 1 | 1 | 100 | ~3 min | 52 | 10,300 | 1.28 |
| 2[b] | NIPAM (limited O$_2$) | 33 | 150 | 1 | 0.5 | 25 | 18 h | 90 | 24,700 | 1.15 |

TABLE 2-continued

Summary of AI-RAFT in air and with various monomers.

| Entry | Monomer | [M] (wt. %) | [M]/[CTA]/[BR$_3$]/[NCO] | | | | Time | Conversion (%) | M$_n$, SEC (g/mol) | Đ |
|---|---|---|---|---|---|---|---|---|---|---|
| 3$^c$ | tBA (limited O$_2$) | 60 | 200 | 1 | 0.5 | 8 | 3 h | 83 | 21,500 | 1.12 |
| 4$^d$ | MMA (limited O$_2$) | 40 | 200 | 1 | 1 | 1 | 5 h | 33 | 7,100 | 1.26 |

All polymerizations were conducted at room temperature.
$^a$CTA = DMP, Polymerization was peformed without any prior deoxygenation.
$^b$Solvent = DMSO and CTA = MDMP.
$^c$Solvent = ethyl acetate and CTA = MDMP.
$^d$Solvent = ethyl acetate and CTA = CPDT Conclusions:

It was demonstrated that RAFT polymerization could be successful initiated using an alkylborane-amine complex deblocked with carboxylic acid and isocyanate functional groups. Through an AI-RAFT process, polymerizations could be performed at room temperature in the presence of limited amounts of oxygen, while maintaining narrow molecular weight distributions over a wide range of molecular weights. The AI-RAFT system was observed to be tolerant to oxygen and allowed for polymerizations to be conducted within minutes under ambient conditions without any prior deoxygenation. Polymerizations conducted with isocyanate deblockers were found to proceed at a faster rate than those deblocked with carboxylic acids, and the AI-RAFT process was capable of synthesizing block copolymers and a range of monomer families including acrylamide, acrylate, and methacrylate.

Additional Information

Materials and Instrumentation:

Reagents:

All monomers were used immediately after removal of inhibitor by passage through a basic alumina column including N,N-dimethylacrylamide (DMA, 99.5% stab. with 100 ppm 4-methoxyphenol, Alfa Aesar), tert-butyl acrylate (tBA, 99%, stabilized with 15 ppm 4-methoxyphenol, Alfa Aesar), methyl methacrylate (MMA, 99% stabilized, Alfa Aesar), and N-isopropylacrylamide (NIPAM, 97% stab., Alfa Aesar). The initiator complex used for AI-RAFT polymerizations was tri-n-butylborane methoxypropylamine (T$_n$BB-MOPA) donated from Callory LLC (Pittsburgh, Pa.) and stored in the glovebox prior to use. The alkylborane used in synthesizing the initiator complex was tri-n-butylborane (T$_n$BB, 98%, Alfa Aesar), and the amine ligand was 3-methoxypropylamine (MOPA, 99+% stab., ACROS Organics). In chain extensions, the thermal initiator used was 2,2'-azobis(2-methyl-propionitrile) (AIBN, 98% stab., Sigma Aldrich). Isophorone diisocyanate (IPDI, 98%, Aldrich) and propionic acid (PA, ≥99.1%, Sigma-Aldrich) were used as deblocker species. The solvents used were ethyl acetate (≥99.5%, Fisher), dimethyl sulfoxide (DMSO, ≥99.7%, Fisher), and chloroform-d (CDCl$_3$, 99.8% (isotopic)), containing 0.03% v/v TMS, Alfa Aesar). The internal standard for polymerization was 1,3,5-trioxane (≥99%, Aldrich). 2,2,6,6-Tetramethylpiperidine 1-oxyl free radical (TEMPO, >98%, TCI) was used as a quenching reagent. The chain transfer agents (CTA) methyl 2-(dodecylthiocarbonothioylthio)-2-methylpropionate (MDMP, 97%), 2-(dodecylthiocarbonothioylthio)-2-methylpropionic acid (DMP, 98%), and 2-cyano-2-propyl dodecyl trithiocarbonate (CPDT, 97%), were purchased from Sigma-Aldrich and used as received. All AI-RAFT polymerizations conducted in this work utilized MDMP as the CTA unless otherwise specified.

Structures and acronyms of the CTAs used in this work:

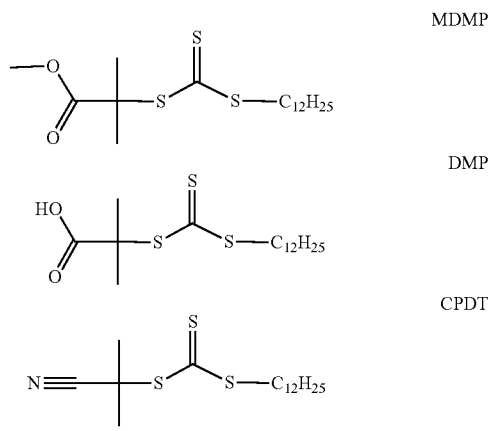

Instruments:

DMAC-SEC:

Relative number-average molecular weight, weight-average molecular weight, and polymer dispersity values were determined using size exclusion chromatography (SEC) in N,N-dimethylacetamide (SEC-DMAC) for the following monomers: DMA, MMA, and NIPAM. The instrument analysis was conducted with a Shimadzu LC-20AD HPLC pump equipped with a Shimadzu RID-20A 120V refractive index detector using HPLC grade DMAC containing 0.03 wt. % LiCl as the mobile phase. The polymer analytes were separated by two PLgel mixed-B Agilent columns connected in series at a flow rate of 1 mL/min and at 55° C. These columns were calibrated against 10 linear poly(methyl methacrylate) standards having M$_n$ values between 800 and 2,570,000 g/mol.

THF-SEC:

Relative number-average molecular weight, weight-average molecular weight, and polymer dispersity values were determined using size exclusion chromatography (SEC) in tetrahydrofuran (THF-SEC) for polymerizations using tert-Butyl Acrylate monomer. The instrument analysis was conducted with a Shimadzu LC-20AD HPLC pump equipped with a Shimadzu RID-20A 120V refractive index detector using HPLC grade THF as the mobile phase. The polymer analytes were separated by two PLgel mixed-B Agilent columns connected in series at a flow rate of 1 mL/min and at 35° C. These columns were calibrated against 10 linear poly(methyl methacrylate) standards having M$_n$ values between 800 and 2,570,000 g/mol.

NMR:

Proton Nuclear Magnetic Resonance (H NMR) was used to calculate monomer conversion. H NMR spectra were obtained using a Varian Unity Inova-300 MHz or 500 MHz spectrometer (Varian, USA) at room temperature with CDCl$_3$ as the NMR solvent. All spectra were recorded using 128 scans with a relaxation delay of 1 second. Trioxane was used as an internal standard for determining monomer conversion and all chemical shifts were referenced to chloroform.

Experimental Details:
Synthesis of Alkyborane-Amine Complex (TnBB-MOPA)

The alkylborane-amine complex was synthesized in a glovebox under a nitrogen atmosphere. Caution: tri-n-butyl borane is pyrophoric! To a scintillation vial was charged 1 mL (4.1 mmol) of tri-n-butyl borane and a stir bar. Afterward, 0.45 mL of 3-methoxypropylamine (4.4 mmol) was slowly added to the alkylborane while stirring which produced a slight exotherm. The reaction mixture was allowed to stir for an additional 30 minutes to produce a clear air-stable alkylborane-amine complex.

AI-RAFT in limited O$_2$ with PA or IPDI:

A representative AI-RAFT procedure, formulated to have 40 wt. % monomer with a molar ratio of [DMA]/[MDMP]/[BR$_3$-L]/[PA]≈350/1/1/21, was conducted as follows. To a 20 mL scintillation vial, under ambient conditions, was added DMA (1.007 g, 10.2 mmol), T$_n$BB-MOPA (0.0078 g, 0.029 mmol), MDMP (0.011 g, 0.029 mmol), trioxane (0.0544 g), and 0.93 g ethyl acetate. The contents of the vial were then vortexed for 10 minutes, or longer, if complete dissolution did not occur. Once a homogenous solution was obtained, a magnetic stir bar was added and a time zero sample was withdrawn for NMR analysis using the trioxane internal standard. The scintillation vial was then sealed using a rubber septum and electrical tape, and sparged with nitrogen for 20 minutes. To commence polymerization, a solution with dissolved oxygen, having no prior deoxygenation, was injected into the scintillation vial via syringe. To maintain a consistent amount of 02 between experiments, the volume of solution injected was kept constant at 0.55 mL comprising 0.0441 g PA (5.96 mmol) in ethyl acetate. After injecting the deblocker solution, the vial was briefly swirled and then placed on a stir plate for 18 hours. Once the allotted time was completed, samples were immediately prepared for NMR to determine monomer conversion and SEC for determination of polymer molecular weight and dispersity. This procedure is representative of the data reported in FIGS. 2A-2C and FIGS. 4A-4B.

Kinetic Experiments AI-RAFT in Limited O$_2$ with PA or IPDI:

A representative AI-RAFT procedure, formulated to have 40 wt. % monomer with a molar ratio of [DMA]/[MDMP]/[BR$_3$-L]/[NCO]≈700/1/2/32, was conducted as follows. To a 20 mL scintillation vial was added DMA (1.0013 g, 10.11 mmol), T$_n$BB-MOPA (0.0078 g, 0.029 mmol), MDMP (0.00544 g, 14 mmol), trioxane (0.0544 g), and 0.93 g ethyl acetate. The contents of the vial were then vortexed for 10 minutes, or longer, if complete dissolution did not occur. Once a homogenous solution was obtained, a magnetic stir bar was added and a time zero sample was withdrawn for NMR analysis using the trioxane internal standard. The scintillation vial was then sealed using a rubber septum and electrical tape, and sparged with nitrogen for 20 minutes. To commence polymerization, a solution with dissolved oxygen, having no prior deoxygenation, was injected into the scintillation vial via syringe. The injected solution volume was kept constant at 0.55 mL to maintain consistent amounts of 02 between experiments comprising 0.051 g IPDI (0.23 mmol) in ethyl acetate. After injecting the deblocker solution, the vial was briefly swirled and then placed on a stir plate for the designated amount of time. Once completed, the polymerization was rapidly quenched by injection of an ethyl acetate solution containing a 10 fold excess of TEMPO (0.045 g, 0.3 mmol) to prevent any further polymerization. Polymerization samples were then immediately prepared for NMR to determine monomer conversion and SEC for determination of polymer molecular weight and dispersity. This procedure is representative of the data reported in FIGS. 3A-3C.

AI-RAFT Under Ambient Conditions with IPDI:

A representative in air AI-RAFT polymerization, formulated to have 52 wt. % monomer with a molar ratio of [DMA]/[DMP]/[BR$_3$-L]/[NCO]≈130/1/1/100, was carried out as follows. To a scintillation vial was added DMA (0.425 g, 4.28 mmol), DMP (0.0237 g, 0.065 mmol), T$_n$BB-MOPA (0.0176 g, 0.065 mmol), and trioxane (0.03 g). Afterward, the scintillation vial was vortexed for 15-20 minutes, or until dissolution occurred. Next, a sample was taken for NMR analysis and a stir bar was added to the vial. The reaction vessel was closed with a rubber septum and sealed with electrical tape before be placed on a stir plate. A solution of IPDI (0.7224 g, 3.25 mmol) and DMA (0.425 g, 4.28 mmol) was then injected into the reactor vessel to initiate polymerization (exotherm occurred). Neither the reactor vessel nor the injection solution were sparged with nitrogen. The polymerization was allowed to proceed for only 3 minutes and a final aliquot was withdrawn to determine molecular weight, dispersity, and monomer conversion. The formulation and characterization of AI-RAFT in air is reported in Table 2.

Synthesis of Poly(DMA) Macro-CTA:

A representative AI-RAFT polymerization, formulated to have 11 wt. % monomer with a molar ratio of [DMA]/[MDMP]/[BR$_3$-L]/[PA]≈90/1/0.5/52, was carried out as follows. To a scintillation vial was added DMA (0.276 g, 2.78 mmol), MDMP (0.012 g, 0.0317 mmol), T$_n$BB-MOPA (0.0043 g, 0.0159 mmol), trioxane (0.0544 g) and ethyl acetate (1.636 g). Afterward, the contents were vortexed for 10 minutes, or until dissolution occurred, and then the solution was sparged with nitrogen for 20 minutes. To commence polymerization a solution with dissolved oxygen was injected, having no prior deoxygenation, into the scintillation vial via syringe. To maintain a consistent amounts of O$_2$ between experiments, the volume of solution injected was kept constant at 0.55 mL prepared from 0.122 g PA (1.65 mmol) in ethyl acetate. After injection of the solution, the reactor was sealed and maintained at room temperature. Polymerization was allowed to proceed for 5 hours. A final aliquot was withdrawn to determine molecular weight and dispersity. The resulting polymer was purified by precipitation thrice from tetrahydrofuran (THF) into hexanes and dried under vacuum to yield a white powder. The final M$_n$ was 7,522 g/mol and the dispersity was 1.17. The formulations and characterization of other macro-CTAs are reported in Table 4.

TABLE 4

Formulations and characterizations of macro-CTAs synthesized by AI-RAFT.

| Entry | [DMA]/[CTA]/[BR$_3$]/[COOH] | | | | M$_n$, SEC (g/mol) | Đ |
|---|---|---|---|---|---|---|
| 1 | 90 | 1 | 2 | 52 | 8,654 | 1.22 |
| 2 | 90 | 1 | 1 | 52 | 8,400 | 1.16 |
| 3 | 90 | 1 | 0.5 | 52 | 7,522 | 1.17 | a-All macro-CTAs were polymerized in ethyl acetate using 10.5 wt. % DMA

Chain Extensions with Thermal Initiated RAFT:

Poly(DMA) macro-CTAs were chain-extended by thermal initiated RAFT using azobisisobutyronitrile (AIBN) formulated to have 11 wt. % monomer with a molar ratio of [DMA]/[Macro-CTA]/[AIBN] 440/1/0.020. A representative chain extension is as follows. To a scintillation vial was added poly(DMA)-CTA (0.130 g, 0.0172 mmol), DMA (0.614 g, 6.19 mmol), AIBN (0.0578 mg, 0.00035 mmol), trioxane (0.0544 g), and dimethyl sulfoxide (4.09 g). The mixture was then vortexed to ensure the macro-CTA was fully dissolved and until a homogenous solution was obtained. The solution was then transferred to a Schlenk flask, a magnetic stir bar was added, and the solution was sparged with nitrogen for 30 minutes. The reactor was then sealed and immersed in a 70° C. oil bath, which was situated on top of a stir plate, for 24 hours. After the allotted time, an aliquot was withdrawn for SEC analysis to determine molecular weight, dispersity, and blocking efficiency.

AI-RAFT with NIPAM, tBA, and MMA:

A representative AI-RAFT procedure, formulated to have 33 wt. % monomer with a molar ratio of [NIPAM]/[MDMP]/[BR$_3$-L]/[NCO]≈150/1/0.5/25, was conducted as follows. To a 20 mL scintillation vial was added NIPAM (0.9772 g, 8.6 mmol), T$_n$BB-MOPA (0.0078 g, 0.029 mmol), MDMP (0.0218 g, 0.058 mmol), trioxane (0.0544 g), and 1.31 g dimethyl sulfoxide. The contents of the vial were then vortexed for 10 minutes, or longer, if complete dissolution did not occur. Once a homogenous solution was obtained, a magnetic stir bar was added and a time zero sample was withdrawn for NMR analysis using the trioxane internal standard. The scintillation vial was then sealed using a rubber septum and electrical tape, and sparged with nitrogen for 20 minutes. To commence polymerization, a solution with dissolved oxygen, having no prior deoxygenation, was injected into the scintillation vial via syringe. The injected solution volume was kept constant at 0.55 mL to maintain a consistent amounts of 02 between experiments comprising 0.16 g IPDI (0.72 mmol) in 0.463 g of dimethyl sulfoxide. After injecting the deblocker solution, the vial was briefly swirled and then placed on a stir plate for 18 hours. Polymerization samples were then immediately prepared for NMR to determine monomer conversion and SEC for determination of polymer molecular weight and dispersity. This procedure is representative of the data reported in Table 2, entry 2.

A representative AI-RAFT procedure, formulated to have 60 wt. % monomer with a molar ratio of [tBA]/[MDMP]/[BR$_3$-L]/[NCO]≈200/1/0.5/4, was conducted as follows. To a 20 mL scintillation vial was added tBA (1.474 g, 11.5 mmol), T$_n$BB-MOPA (0.0078 g, 0.029 mmol), MDMP (0.0218 g, 0.058 mmol), trioxane (0.045 g), and 0.381 g ethyl acetate. The contents of the vial were then vortexed for 10 minutes, or longer, if complete dissolution did not occur. Once a homogenous solution was obtained, a magnetic stir bar was added and a time zero sample was withdrawn for NMR analysis using the trioxane internal standard. The scintillation vial was then sealed using a rubber septum and electrical tape, and sparged with nitrogen for 20 minutes. To commence polymerization, a solution with dissolved oxygen, having no prior deoxygenation, was injected into the scintillation vial via syringe. The injected solution volume was kept constant at 0.55 mL to maintain a consistent amount of 02 between experiments comprising 0.057 g IPDI (0.226 mmol) in 0.445 g of ethyl acetate. After injecting the deblocker solution, the vial was briefly swirled and then placed on a stir plate for 3 hours. Polymerization samples were then immediately prepared for NMR to determine monomer conversion and SEC for determination of polymer molecular weight and dispersity. This procedure is representative of the data reported in Table 2, entry 3.

A representative AI-RAFT procedure, formulated to have 46 wt. % monomer with a molar ratio of [MMA]/[CPDT]/[BR$_3$-L]/[NCO]≈200/1/1/1, was conducted as follows. To a 20 mL scintillation vial was added MMA (0.936 g, 11.5 mmol), T$_n$BB-MOPA (0.0156 g, 0.058 mmol), CPDT (0.0199 g, 0.058 mmol), trioxane (0.0544 g), and 0.80 g ethyl acetate. The contents of the vial were then vortexed for 10 minutes, or longer, if complete dissolution did not occur. Once a homogenous solution was obtained, a magnetic stir bar was added and a time zero sample was withdrawn for NMR analysis using the trioxane internal standard. The scintillation vial was then sealed using a rubber septum and electrical tape, and sparged with nitrogen for 20 minutes. To commence polymerization, a solution with dissolved oxygen, having no prior deoxygenation, was injected into the scintillation vial via syringe. The injected solution volume was kept constant at 0.52 mL to maintain a consistent amount of 02 between experiments comprising 0.0064 g IPDI (0.029 mmol) in 0.463 g of ethyl acetate. After injecting the deblocker solution, the vial was briefly swirled and then placed on a stir plate for 5 hours. Polymerization samples were then immediately prepared for NMR to determine monomer conversion and SEC for determination of polymer molecular weight and dispersity. This procedure is representative of the data reported in Table 2, entry 4.

REFERENCES

The following references may be useful in understanding some of the principles discussed herein:

(1) Matyjaszewski, K.; Dong, H.; Jakubowski, W.; Pietrasik, J.; Kusumo, A., Grafting from Surfaces for "Everyone": ARGET ATRP in the Presence of Air. *Langmuir* 2007, 23, 4528-4531.

(2) Zhang, L.; Cheng, Z.; Shi, S.; Li, Q.; Zhu, X., AGET ATRP of methyl methacrylate catalyzed by FeCl3/iminodiacetic acid in the presence of air. *Polymer* 2008, 49, 3054-3059.

(3) Yang, Q.; Lalevée, J.; Poly, J., Development of a Robust Photocatalyzed ATRP Mechanism Exhibiting Good Tolerance to Oxygen and Inhibitors. *Macromolecules* 2016, 49, 7653-7666.

(4) Borská, K.; Moravčiková, D.; Mosnáček, J., Photochemically Induced ATRP of (Meth)Acrylates in the Presence of Air: The Effect of Light Intensity, Ligand, and Oxygen Concentration. *Macromol. Rapid Commun.* 2017, 38, 1600639-n/a.

(5) Fleischmann, S.; Rosen, B. M.; Percec, V., SET-LRP of acrylates in air. *J. Polym. Sci., Part A: Polym. Chem.* 2010, 48, 1190-1196.

(6) Braunecker, W. A.; Matyjaszewski, K., Controlled/living radical polymerization: Features, developments, and perspectives. *Prog. Polym. Sci.* 2007, 32, 93-146.

(7) Wang, J.; Rivero, M.; Muñoz Bonilla, A.; Sanchez-Marcos, J.; Xue, W.; Chen, G.; Zhang, W.; Zhu, X., Natural RAFT Polymerization: Recyclable-Catalyst-Aided, Opened-to-Air, and Sunlight-Photolyzed RAFT Polymerizations. *ACS Macro Lett.* 2016, 5, 1278-1282.

(8) Fu, Q.; Xie, K.; McKenzie, T. G.; Qiao, G. G., Trithiocarbonates as intrinsic photoredox catalysts and RAFT agents for oxygen tolerant controlled radical polymerization. *Polym. Chem.* 2017, 8, 1519-1526.

(9) Xu, J.; Jung, K.; Boyer, C., Oxygen Tolerance Study of Photoinduced Electron Transfer-Reversible Addition- Fragmentation Chain Transfer (PET-RAFT) Polymerization Mediated by Ru(bpy)3Cl2. *Macromolecules* 2014, 47, 4217-4229.
(10) Chapman, R.; Gormley, A. J.; Herpoldt, K.-L.; Stevens, M. M., Highly Controlled Open Vessel RAFT Polymerizations by Enzyme Degassing. *Macromolecules* 2014, 47, 8541-8547.
(11) Zhang, B.; Wang, X.; Zhu, A.; Ma, K.; Lv, Y.; Wang, X.; An, Z., Enzyme-Initiated Reversible Addition-Fragmentation Chain Transfer Polymerization. *Macromolecules* 2015, 48, 7792-7802.
(12) Liu, Z.; Lv, Y.; An, Z., Enzymatic Cascade Catalysis for the Synthesis of Multiblock and Ultrahigh-Molecular-Weight Polymers with Oxygen Tolerance. *Angew. Chem. Int. Ed.* 2017, 56, 13852-13856.
(13) Xu, J.; Jung, K.; Atme, A.; Shanmugam, S.; Boyer, C., A Robust and Versatile Photoinduced Living Polymerization of Conjugated and Unconjugated Monomers and Its Oxygen Tolerance. *J. Amer. Chem. Soc.* 2014, 136, 5508-5519.
(14) Shanmugam, S.; Xu, J.; Boyer, C., Exploiting Metalloporphyrins for Selective Living Radical Polymerization Tunable over Visible Wavelengths. *J. Amer. Chem. Soc.* 2015, 137, 9174-9185.
(15) Shanmugam, S.; Xu, J.; Boyer, C., Photoinduced Oxygen Reduction for Dark Polymerization. *Macromolecules* 2017.
(16) Xu, J.; Shanmugam, S.; Duong, H. T.; Boyer, C., Organo-photocatalysts for photoinduced electron transfer-reversible addition-fragmentation chain transfer (PET-RAFT) polymerization. *Polym. Chem.* 2015, 6, 5615-5624.
(17) Yeow, J.; Chapman, R.; Xu, J.; Boyer, C., Oxygen tolerant photopolymerization for ultralow volumes. *Polym. Chem.* 2017.
(18) Xu, S.; Ng, G.; Xu, J.; Kuchel, R. P.; Yeow, J.; Boyer, C., 2-(Methylthio)ethyl Methacrylate: A Versatile Monomer for Stimuli Responsiveness and Polymerization-Induced Self-Assembly in the Presence of Air. *ACS Macro Lett.* 2017, 6, 1237-1244.
(19) Fu, Q.; Ruan, Q.; McKenzie, T. G.; Reyhani, A.; Tang, J.; Qiao, G. G., Development of a Robust PET-RAFT Polymerization Using Graphitic Carbon Nitride (g-C3N4). Macromolecules 2017, 50, 7509-7516.
(20) Lee, I.-H.; Discekici, E. H.; Anastasaki, A.; de Alaniz, J. R.; Hawker, C. J., Controlled radical polymerization of vinyl ketones using visible light. *Polym. Chem.* 2017, 8, 3351-3356.
(21) Ren, K.; Perez-Mercader, J., Thermoresponsive gels directly obtained via visible light-mediated polymerization-induced self-assembly with oxygen tolerance. *Polym. Chem.* 2017, 8, 3548-3552.
(22) Ng, G.; Yeow, J.; Xu, J.; Boyer, C., Application of oxygen tolerant PET-RAFT to polymerization-induced self-assembly. *Polym. Chem.* 2017, 8, 2841-2851.
(23) Ahn, D.; Wier, K. A.; Mitchell, T. P.; Olney, P. A., Applications of Fast, Facile, Radiation-Free Radical Polymerization Techniques Enabled by Room Temperature Alkylborane Chemistry. *ACS Applied Materials & Interfaces* 2015, 7, 23902-23911.
(24) Chung, T. C.; Janvikul, W.; Lu, H. L., A Novel "Stable" Radical Initiator Based on the Oxidation Adducts of Alkyl-9-BBN. *J. Amer. Chem. Soc.* 1996, 118, 705-706.
(25) Fedorov, A. V.; Ermoshkin, A. A.; Neckers, D. C., Remote polymerization of coatings with the release of borane from its amine complex. *Journal of Applied Polymer Science* 2008, 107, 147-152.
(26) Wang, Z. M.; Hong, H.; Chung, T. C., Synthesis of Maleic Anhydride Grafted Polypropylene with High Molecular Weight Using Borane/O2 Radical Initiator and Commercial PP Polymers. *Macromolecules* 2005, 38, 8966-8970.
(27) Welch, F. J., Polymerization of methyl methacrylate by triethylboron-oxygen mixtures. *Journal of Polymer Science* 1962, 61, 243-252.
(28) Sonnenschein, M. F.; Webb, S. P.; Redwine, O. D.; Wendt, B. L.; Rondan, N. G., Physical and Chemical Probes of the Bond Strength between Trialkylboranes and Amines and Their Utility as Stabilized Free Radical Polymerization Catalysts. *Macromolecules* 2006, 39, 2507-2513.
(29) Onak, T., Chapter 4—Four-Coordinate Organoboranes. In Organoborane Chemistry, Academic Press: 1975; pp 136-163.
(30) Sonnenschein, M. F.; Webb, S. P.; Kastl, P. E.; Arriola, D. J.; Wendt, B. L.; Harrington, D. R.; Rondan, N. G., Mechanism of Trialkylborane Promoted Adhesion to Low Surface Energy Plastics. *Macromolecules* 2004, 37, 7974-7978.
(31) Brown, H. C.; Midland, M. M., Initiation rates for autoxidation of trialkylboranes. Effect of a steric factor on the initiation rate. *Journal of the Chemical Society* D: Chemical Communications 1971, 699-700.
(32) Davies, A. G.; Ingold, K. U.; Roberts, B. P.; Tudor, R., Homolytic organometallic reactions. Part II. The kinetics and rate constants for the autoxidation of organoboron compounds in solution. *Journal of the Chemical Society B: Physical Organic* 1971, 698-712.
(33) Moran, A. C.; Lebedeva, N. V.; Richert, S.; Forbes, M. D. E., Spin Trapping Studies of Amine-Stabilized Trialkylborane Free Radical Initiator Systems: Kinetics and Mechanism. Applied Magnetic Resonance 2011, 41, 295-303.
(34) Fedorov, A. V.; Ermoshkin, A. A.; Mejiritski, A.; Neckers, D. C., New Method To Reduce Oxygen Surface Inhibition by Photorelease of Boranes from Borane/Amine Complexes. *Macromolecules* 2007, 40, 3554-3560.
(35) Okamura, H.; Sudo, A.; Endo, T., Generation of radical species on polypropylene by alkylborane-oxygen system and its application to graft polymerization. *J. Polym. Sci., Part A: Polym. Chem.* 2009, 47, 6163-6167.
(36) Denisov, E. T.; Denisova, T. G.; Pokidova, T. S., *Handbook of Free Radical Initiators*. Wiley: 2003.
(37) Kochi, J. K., *Free radicals*. Wiley: 1973.
(38) Qiu, X.-P.; Winnik, F. M., Facile and Efficient One-Pot Transformation of RAFT Polymer End Groups via a Mild Aminolysis/Michael Addition Sequence. *Macromol. Rapid Commun.* 2006, 27, 1648-1653.
(39) Ligon, S. C.; Husar, B.; Wutzel, H.; Holman, R.; Liska, R., Strategies to Reduce Oxygen Inhibition in Photoinduced Polymerization. *Chem. Rev.* 2014, 114, 557-589.
(40) Shkapenko, G.; Gmitter, G. T.; Gruber, E. E., Mechanism of the Water-Isocyanate Reaction. *Industrial & Engineering Chemistry* 1960, 52, 605-608.
(41) Hill, M. R.; Carmean, R. N.; Sumerlin, B. S., Expanding the Scope of RAFT Polymerization: Recent Advances and New Horizons. *Macromolecules* 2015, 48, 5459-5469.
(42) Gody, G.; Maschmeyer, T.; Zetterlund, P. B.; Perrier, S., Rapid and quantitative one-pot synthesis of sequence-controlled polymers by radical polymerization. *Nat Commun* 2013, 4, 2505.

(43) Sonnenschein, M. F.; Redwine, 0. D.; Wendt, B. L.; Kastl, P. E., Colloidal Encapsulation of Hydrolytically and Oxidatively Unstable Organoborane Catalysts and Their Use in Waterborne Acrylic Polymerization. *Langmuir* 2009, 25, 12488-12494.

(44) Sun, X.-L.; He, W.-D.; Li, J.; Li, L.-Y.; Zhang, B.-Y.; Pan, T.-T., RAFT Cryopolymerizations of N,N-dimethylacrylamide and N-isopropylacrylamide in Moderately Frozen Aqueous Solution. *J. Polym. Sci., Part A: Polym. Chem.* 2009, 47, 6863-6872.

What is claimed is:

1. A method of preparing a polymer comprising a step of: polymerizing a radically polymerizable monomer via reversible-addition fragmentation chain-transfer (RAFT) in a polymerization medium comprising:
   (a) a chain transfer agent, and
   (b) a free radical initiator prepared by oxidizing a reaction product of a ligand-reactive decomplexation agent and an alkyl-borane complex of the formula:

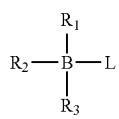

wherein $R_1$, $R_2$, and $R_3$ are independently selected from the group consisting of hydrogen, an alkyl group containing from 1 to 12 carbon atoms, a cycloalkyl group containing from 3-12 carbon atoms, and an aryl group containing from 6 to 12 carbon atoms, wherein the aryl group may be optionally substituted with an alkyl group having from 1 to 10 carbon atoms, and at least one of $R_1$, $R_2$, and $R_3$ is an alkyl group, a cycloalkyl group or an aryl group, and L is a complexing agent selected from the group consisting of one or more amine groups, amidine groups, hydroxide groups, alkoxyl groups, alkyl ether groups, alkoxide groups and mixtures thereof.

2. The method of claim 1, wherein the ligand-reactive decomplexation agent comprises at least one of an organic acid, an inorganic acid, a carboxylic acid, an acid anhydride, a thiol, an alcohol, an aldehyde, an isocyanate, a phosphonic acid, and a 1,3-dicarbonyl.

3. The method of claim 2, wherein the ligand-reactive decomplexation agent is selected from the group consisting of isophorone diisocyanate, toluene diisocyanate, diphenylmethane diisocyanate, acetic acid, trifluoroacetic acid, acrylic acid, propionic acid, methacrylic acid, acrylic acid, and ammonia.

4. The method of claim 1, wherein $R_1$, $R_2$, and $R_3$ are independently selected from the group consisting of an alkyl group containing from 1 to 10 carbon atoms.

5. The method of claim 1, wherein $R_1$, $R_2$, and $R_3$ are independently selected from the group consisting of an alkyl group containing from 1 to 4 carbon atoms.

6. The method of claim 1, wherein $R_1$, $R_2$, and $R_3$ are alkyl groups containing from 1 to 10 carbon atoms and L is an amine selected from the group consisting of a primary amine, a secondary amine, a tertiary amine, and a polyamine having primary and/or secondary amino groups and mixtures thereof.

7. The method of claim 1, wherein the alkyl-borane complex is an alkyl-borane amine-complex of the formula (II):

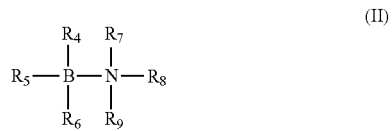

wherein $R_4$, $R_5$, and $R_6$ are independently selected from the group consisting of hydrogen, an alkyl group containing from 1 to 12 carbon atoms and an aryl group containing from 1 to 12 carbon atoms, at least one of $R_4$, $R_5$, and $R_6$ is an alkyl group or an aryl group, and $R_7$, $R_8$, and $R_9$ are independently selected from hydrogen, and an optionally substituted alkyl group containing from 1 to 12 carbon atoms, wherein each said alkyl group $R_7$, $R_8$, and $R_9$ may be optionally substituted with one or more of halo groups, alkoxy groups, mercapto groups, nitro groups, nitroso groups, sulfoxy groups, pyridyl groups, furyl groups, thienyl groups, imidazoyl groups, and sulfur, with the proviso that not more than two of $R_7$, $R_8$, and $R_9$ are simultaneously hydrogen.

8. The method of claim 7, wherein $R_7$ and $R_9$ are hydrogen, and $R_8$ is an alkyl group containing 1 to 10 carbon atoms and is optionally substituted with an alkoxy group.

9. The method of claim 7, wherein the alkyl-borane amine-complex is selected from the group consisting of tri-n-butylborane methoxypropylamine, triethylborane-diethylenetriamine, and 1,3-propanediamine-triethylborane.

10. The method of claim 1, wherein the reversible-addition fragmentation chain-transfer (RAFT) is carried out at room temperature.

11. The method of claim 1, wherein the monomer is present in an amount of 5 to 99 wt. %, based on the total weight of the polymerization medium.

12. The method of claim 1, wherein the polymerization medium further comprises a solvent present in an amount of 1-99 wt. %, based on the total weight of the polymerization medium.

13. The method of claim 1, wherein the polymerization medium further comprises water, and the monomer is polymerized by a process selected from suspension polymerization, emulsion polymerization, miniemulsion polymerization, and microemulsion polymerization.

14. The method of claim 1, wherein the free radical initiator is added to the polymerization process initially, gradually, sequentially, or continuously during the polymerization.

15. The method of claim 1, wherein the reaction product is oxidized by oxygen.

16. The method of claim 15, wherein a molar ratio of moles of oxygen to moles of alkyl borane amine complex used for preparing the free radical initiator is from 0.1:1 to 20:1.

17. The method of claim 1, wherein the chain transfer agent is selected from the group consisting of dithioesters, dithiobenzoates, trithiocarbonates, dithiocarbamates, disulphides, xanthate disulphides, dithiocarbonates, and xanthates.

18. The method of claim 1, wherein the radically polymerizable monomer is selected from the group consisting of (meth)acrylate esters of $C_1$-$C_{20}$ alcohols, acrylonitrile, cyanoacrylate esters of $C_1$-$C_{20}$ alcohols, didehydromalonate diesters of $C_1$-$C_6$ alcohols, vinyl pyridines, vinyl N—$C_1$-$C_6$-alkylpyrroles, vinyl oxazoles, vinyl thiazoles, vinyl pyrimidines, vinyl imidazoles, vinyl acetate, vinyl ether, vinyl sulfide, styrene, ketones, acrylamide, methacrylamide, acrylate, (meth)acrylate, vinyl ketones, styrene, methyl (meth)acrylate, butyl acrylate, and 2-ethylhexyl acrylate monomers and mixtures of two or more of said monomers.

19. The method of claim 1 wherein the radically polymerizable monomer is selected from the group consisting of N,N-dimethylacrylamide (DMA), tert-butyl acrylate (tBA), methyl methacrylate (MMA), N-isopropylacrylamide (NIPAM), acrylates, methacrylates, acrylamide, methacrylamides, vinyl acetate, ethylene, propylene, styrene, vinylidene chloride, vinylidene fluoride, butadiene, methyl methacrylate, 4-vinyl pyridine, N-vinyl carbazole, vinyl chloride, vinyl fluoride and tetrafluoroethylene.

20. The method of claim 18, wherein the radically polymerizable monomer comprises two or more polymerizable moieties.

* * * * *